United States Patent [19]

Nakamura et al.

[11] Patent Number: 5,738,074
[45] Date of Patent: Apr. 14, 1998

[54] ENGINE CONTROL SYSTEM AND METHOD

[75] Inventors: Michihisa Nakamura; Noritaka Matsuo, both of Iwata, Japan

[73] Assignee: Yamaha Hatsudoki Kabushiki Kaisha, Iwata, Japan

[21] Appl. No.: 725,065

[22] Filed: Oct. 2, 1996

[30] Foreign Application Priority Data

| Oct. 2, 1995 | [JP] | Japan | 7-254847 |
| Oct. 10, 1995 | [JP] | Japan | 7-292255 |
| Nov. 10, 1995 | [JP] | Japan | 7-292258 |
| Nov. 10, 1995 | [JP] | Japan | 7-292259 |
| Nov. 10, 1995 | [JP] | Japan | 7-292644 |

[51] Int. Cl.$^6$ .................................................. F02P 5/14
[52] U.S. Cl. .................................................. 123/425
[58] Field of Search .................... 123/425, 435, 123/432, 90.27; 73/116, 117.3, 115, 47; 364/431.03

[56] References Cited

U.S. PATENT DOCUMENTS

| 3,444,730 | 5/1969 | Bysarovich | 73/115 |
| 3,978,718 | 9/1976 | Schorsch | 73/117 |
| 4,567,755 | 2/1986 | Ootsuka et al. | 73/117.3 |
| 4,633,707 | 1/1987 | Haddox | 73/47 |
| 4,691,288 | 9/1987 | Kay et al. | 364/511 |
| 4,739,649 | 4/1988 | Tanaka | 73/115 |
| 4,744,243 | 5/1988 | Tanaka | 73/115 |
| 4,781,059 | 11/1988 | Suzuki et al. | 73/117.3 |
| 4,843,870 | 7/1989 | Citron et al. | 73/116 |
| 4,892,075 | 1/1990 | Iriyama et al. | 123/425 |
| 4,898,025 | 2/1990 | Weyland | 73/117.3 |
| 4,995,359 | 2/1991 | Yokoyama et al. | 123/188 M |
| 5,095,858 | 3/1992 | Ascari | 123/90.27 |
| 5,099,812 | 3/1992 | Yamada | 123/432 |
| 5,127,262 | 7/1992 | Demizu et al. | 73/117.3 |
| 5,191,788 | 3/1993 | Nishimura | 73/117.3 |
| 5,196,844 | 3/1993 | Tomisawa et al. | 340/870.29 |
| 5,197,325 | 3/1993 | Tamura et al. | 73/117.3 |
| 5,245,866 | 9/1993 | Hashiguchi et al. | 73/117.3 |
| 5,263,451 | 11/1993 | Andreasson | 123/425 |
| 5,265,574 | 11/1993 | Philipp et al. | 123/422 |
| 5,276,625 | 1/1994 | Nakinawa | 364/431.08 |
| 5,287,737 | 2/1994 | Osawa et al. | 73/117.3 |
| 5,309,756 | 5/1994 | Osawa et al. | 73/116 |
| 5,359,518 | 10/1994 | Wimmer | 364/431.03 |
| 5,379,634 | 1/1995 | Kuroda et al. | 73/116 |
| 5,507,263 | 4/1996 | Yamazaki et al. | 123/425 |

FOREIGN PATENT DOCUMENTS

| 0153004 | 8/1985 | European Pat. Off. | 123/425 |
| 0199431 | 10/1986 | European Pat. Off. | 123/425 |
| 0344598 | 12/1989 | European Pat. Off. | 123/425 |
| 0542264 | 5/1993 | European Pat. Off. | 123/425 |
| 0595316 | 5/1994 | European Pat. Off. | 123/425 |
| 0611883 | 8/1994 | European Pat. Off. | 123/425 |

OTHER PUBLICATIONS

European Search Report dated Jul. 19, 1995.
European Search Report dated Nov. 8, 1994.
IEEE Transactions on Vehicular Technology, vol. 38,No.3, Aug. 1989, New York U.S. pp. 180–192, XP000101478 G. Rizzoni 'A Stochastic Model for the Indicated Pressure Process and the Dynamics of the Internal Combustion Engine' (the whole document).
Patent Abstracs of Japan, vol. 6, No. 113 (P–129) (1011) Jul. 20, 1982 & JP-A-51 07 235 (Toyota Jidosha Kogyo K.K.) Apr. 6, 1994.
Patent Abstracts of Japan, vol. 11, No. 14, (M–553) Jan. 14, 1987 & JP-A-61 190147 (Toyoto Motor Corp) Aug. 23, 1986.

*Primary Examiner*—Raymond A. Nelli
*Attorney, Agent, or Firm*—Knobbe, Martens, Olson & Bear LLP

[57] ABSTRACT

A number of embodiments of engine controls and engine control methods that employ instantaneous rate of combustion is the combustion chamber at a sensed parameter. Rate of combustion is determined by a linear equation based upon data arrived from combustion chamber pressures. The system is adapted to operate under different control modes so as to provide specific control for normal running, lean burn, maximum torque, cold starting, transient conditions, and/or knock control.

58 Claims, 29 Drawing Sheets

ENGINE CONTROL SYSTEM AND METHOD

BACKGROUND OF THE INVENTION

This invention relates to an engine control system and method and more particularly to an improved method and system for permitting engine running adjustment to vary the performance to suit certain conditions.

In an effort to promote good engine running conditions and effective exhaust emission control, a wide variety of types of control methodology and techniques have been employed. One general type includes the concept of measuring certain running characteristics of the engine and mapping the desired air-fuel ratio for these conditions. With this general type of system, sometimes referred to as an "open control system", the engine running conditions are measured, and then a map is consulted for determining both the air-fuel ratio and the timing of combustion initiation. The air-fuel ratio can be changed by altering either the amount of fuel supplied to the engine and/or the amount of air supplied to the engine. Combustion initiation can be controlled by controlling the timing of firing of a spark plug or, in a diesel engine, the timing of the beginning of injection. In addition, the timing of fuel injection may also be adjusted in response to the sensed engine running characteristics.

Although this type of system is effective, it still has a number of disadvantages. First, the system cannot operate so as to compensate for changes in the engine characteristics which may make the premaped conditions and values inaccurate for the actual condition of the engine. For example, if carbon buildup occurs in the combustion chamber, the compression ratio may change, and the premaped variables may not be acceptable. Also, other factors such as wear between the piston, piston rings, and cylinder bore or other components can change the desired characteristics.

More importantly, however, these types of mapped systems do not permit or accommodate cycle-to-cycle variations in the engine, nor do they accommodate cylinder-to-cylinder variations.

There have been proposed, therefore, feedback control systems. These types of systems use sensors which can sense the actual air-fuel ratio in the combustion chamber. This can be done by utilizing devices such as oxygen sensors that are in the exhaust system and sense the amount of oxygen in the exhaust gases. This gives an indication of the actual air-fuel ratio being burned in the engine.

With this type of system, when the air-fuel ratio differs from the predetermined or desired ratio, then the feedback control system operates to bring the ratio back into that desired. Again, however, these systems do not truly compensate for deterioration or change in engine conditions, nor are they particularly effective in measuring cylinder-to-cylinder variations or variations from cycle to cycle.

Although the combustion condition sensor may be positioned so that it will sample either an individual cylinder or a cycle-to-cycle variation for cylinders, these systems do not truly operate to permit such finite adjustment.

Another control methodology has been employed which senses actual conditions in the combustion chamber. This type of system measures instantaneous cylinder pressure, and from that can obtain information regarding the indicated mean effective pressure (IMEP) of the engine, and thus adjustments can be made to obtain maximum output. A system and method utilizing this concept is disclosed in the copending application of the same title, Ser. No. 08/645,121, filed May 13, 1996, in the names of the inventors hereof and of Kousei Maebashi, which application is assigned to the assignee hereof.

That application also indicates that the pressure in the cylinder can be utilized to determine the fuel burn rate or combustion rate burn rate in the engine cylinder. This characteristic may be referred to as FMB, which stands generally for fraction of mass burned.

As has been noted, the previously proposed systems have all operated generally on the principle of trying to match the total engine performance to a preset fixed value for a given engine running condition. However, there are certain variations in engine conditions or certain times when it may be desirable to operate the engine on a different principle and for a different purpose from the basic control principle.

For example, the system described in the aforenoted copending application is designed primarily to obtain maximum engine torque or power under all running conditions. However, it may be desirable to operate the engine so that the basic control strategy is other than that to obtain maximum engine torque. There are, however, some situations where the operation of the engine should be set so as to provide a variation in the engine performance.

It is, therefore, a principal object of this invention to provide an improved control method and system for an internal combustion engine where the engine combustion performance may be varied to suit a particular desired condition.

It is a further object of this invention to provide an engine control system and methodology wherein the basic engine control can be modified in response to certain desired conditions to obtain superior performance for those particular conditions.

Although most engine control systems and methods incorporate some arrangement for modifying the basic engine control for a particular condition, they do this by adjusting the control parameters to accomplish what are believed to be preset values for the particular condition. For example, in the condition of obtaining maximum power, the engine may be set so as to provide the desired pressure at one or more points in the pressure curve, and this system operates under all running conditions. However, there may be many other running conditions where this maximum power output is neither desired nor practical.

Another condition which may be accommodated with more conventional systems is the condition where it is desired to operate the engine in a lean burn mode. Such lean burn operations permit reduction in hydrocarbons, and generally the control strategy is that in certain wide ranges of engine performance, the engine operates on a lean burn cycle. However, these systems do not permit finite operation under one or several successive combustion cycles where lean burn operation may be accomplished.

Another condition which is accommodated in some systems is the condition of transient running. During acceleration or deceleration it may be desired to change the air-fuel ratio to accommodate those conditions. However, again, these systems all operate with preset variables where the basic control is only modified and the modification is made in response to the sensed condition, rather than the actual engine running condition.

It is, therefore, a still further object of this invention to provide an improved engine control system and method where the engine is operated based upon conditions occurring actually in the combustion chamber, and that combustion chamber condition can be varied to obtain the desired results.

Other types of running conditions where modification in the basic control may be desired is for cold starting. Generally, with cold starting, the engine is operated in a richer mode so as to ensure quick warm up. This may frequently be done also where there is a catalytic exhaust system so as to ensure that the catalyst reaches its operating temperature earlier in the cycle than would otherwise be possible. Again, however, these systems operate by merely providing a gross adjustment in the air-fuel ratio and without sensing its actual effect on the individual combustion in the combustion chamber.

It is, therefore, a further object of this invention to provide an improved control for an engine whereby adjustments to suit specific conditions are made based upon the actual condition in the combustion chamber.

A still further feature which is accommodated in certain engine running conditions is to avoid the likelihood of pre-ignition and/or knocking. Again, this control is made by making adjustments in the ignition timing and/or fuel supply based upon fixed incremental variations from the normal conditions. Thus, the actual engine running condition is not measured or accommodated.

It is, therefore, yet a further object of this invention to provide an improved control system and method for an internal combustion engine wherein various protective conditions may be initiated based on the actual condition in the combustion chamber.

It is a further object of this invention to provide an engine control system and method wherein the engine is operated to maintain a desired condition in the combustion chamber, and that desired condition can be adjusted to obtain desired results such as maximum torque, lean burning, adjustment for transient conditions, accommodation for cold starting, and/or knock prevention.

As has been noted, the aforenoted copending application has noted the potentiality of measuring burning rate (FMB) in the combustion chamber during a cycle of operation by measuring pressure. This invention deals with the utilization of the measurement of the fractional mass burned in the combustion chamber at either a single crank angle or at several crank angles so as to provide adjustments which can promote good overall engine performance and accommodate the various factors noted above.

SUMMARY OF THE INVENTION

This invention is adapted to be embodied in a method and system for controlling an internal combustion engine that has at least one variable volume chamber in which combustion occurs and which will be referred to as the combustion chamber. An induction system delivers an air charge to the combustion chamber, and a fuel charging system delivers a fuel charge to the combustion chamber for combustion therein. An exhaust system is provided for discharging combustion products from the combustion chamber.

In accordance with a method for practicing the invention, the rate of combustion in the combustion chamber is determined at at least one relative volume of the combustion chamber. The measured rate of combustion is compared with a target value. Adjustment of at least one of the systems is then performed to establish the target value of rate of combustion in the combustion chamber to suit a specific engine running requirement.

A system for practicing the invention in conjunction with an engine as described includes means for sensing the rate of combustion in the combustion chamber at at least one relative volume of the combustion chamber. A comparator is provided for comparing the sensed combustion rate with a target value. An adjustment is made in at least one of the systems in order to obtain concurrence between the measured combustion rate and the targeted combustion rate to obtain the desired engine performance.

In accordance with further features of the invention, the adjustments made can be varied to provide maximum torque, lean burn combustion, transient control for acceleration and/or deceleration, cold starting assist, and/or pre-ignition control.

DETAILED DESCRIPTION OF THE
PREFERRED EMBODIMENTS OF THE
INVENTION

Figure 1:
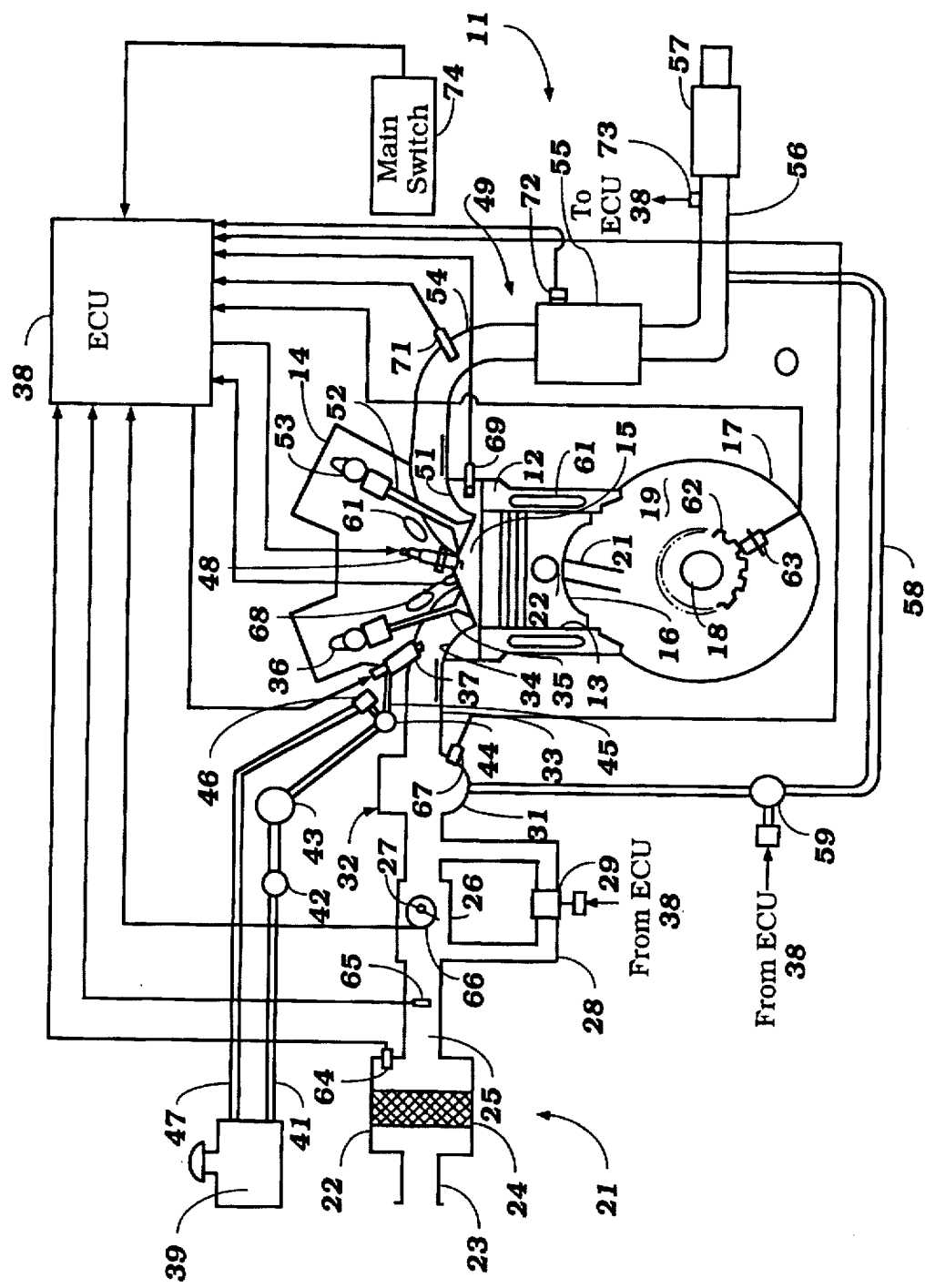
FIG. 1 is a partially schematic cross-sectional view taken through a single cylinder of a multi-cylinder, four-cycle internal combustion engine constructed and operated in accordance with the first embodiments of the invention.

Referring now initially first to FIG. 1, a four-cycle internal combustion engine constructed in accordance with this embodiment is shown partially and in somewhat schematic fashion. In the illustrated embodiment, the engine 11 is shown as a multi-cylinder in-line, spark ignited, type, although a cross-section of only a single cylinder appears in the drawing. Although the invention is described in conjunction with such an engine, it will be readily apparent to those skilled in the art how the invention may be practiced with multiple cylinder and/or single cylinder four-cycle engines having any configuration. Also and as will become apparent by reference to FIGS. 5 and 6, the invention may also be practiced with two-cycle engines having a wide variety of configurations. As will also be described, the invention may be practiced with two or four cycle diesel as well as spark ignited engines.

The engine 11 may be used as a power plant for many types of applications, as will be apparent to those skilled in the art. In a preferred embodiment the engine 11 may be used to power a motor vehicle such as an automobile.

The engine 11 is comprised of a cylinder block 12 having one or more cylinder bores 13. The upper ends of the cylinder bores 13 are closed by a cylinder head assembly 14 that is affixed to the cylinder block 12 in a known manner. The cylinder head assembly 14 has individual recesses 15 that cooperate with each of the cylinder bores 13. These recesses 15, the cylinder bores 13 and pistons 14 which reciprocate in the cylinder bores 13 form the variable volume combustion chambers of the engine. At time, the combustion chamber will be designated by the reference numeral 15, because the clearance area provided by this recess constitutes a substantial portion of a volume of the engine 11 when at its top dead center (TDC) position.

The end of the cylinder bore 13 opposite from the cylinder head recess 15 is closed by a crankcase member 17 which is also affixed to the cylinder block 12 in a known manner. A crankshaft 18 is rotatably journaled in a crankcase chamber 19 formed by the crankcase member 17 and a skirt of the cylinder block 12. This journaling of the crankshaft 18 may be of any known type. In fact, since the primary portion of the invention deals with the engine measurement and control strategy, a generally conventional engine has been illustrated. Therefore, if any details of the engine 11 are not described, they may be considered to be conventional.

A connecting rod 21 is connected by means of a piston pin 22 to the piston 16. The opposite end of the connecting rod 21 is journaled on a throw of the crankshaft 18 in a well known manner.

An induction system, indicated generally by the reference numeral 21, is provided for supplying a charge to the combustion chambers 15. This induction system 21 includes an air inlet device 22 which has an atmospheric air inlet 23 that draws air from the atmosphere. A filter element 24 may be provided in the air inlet device 22. The air inlet device 22 delivers the air through a passageway 25 to a throttle body 26 upon which a throttle valve 27 is supported. An bypass passage 28 extends around the throttle body 26 and has a flow controlling bypass valve 29 positioned therein.

The throttle body 26 and bypass passageway 28 deliver the intake air to a plenum portion 31 of an intake manifold, indicated generally by the reference numeral 32. The intake manifold 32 has individual runners 33 which serve cylinder head intake passages 34 that terminate in intake valve seats in the cylinder head recess 15. Poppet-type intake valves 35 control the opening and closing of these valve seats and the communication of the induction system 21 with the combustion chambers 15. The intake valves 35 may be opened and closed in a known manner, for example via an overhead mounted intake camshaft 36, which is driven at one-half crankshaft speed by any suitable drive mechanism.

In addition to the air charge supplied by the induction system 21, there is also supplied a fuel charge. In the specific embodiment illustrated, the charge former comprises a manifold-type fuel injector 37 which is mounted in the cylinder head assembly 14 and which sprays into the cylinder head intake passage 34. The fuel injector 37 is of the electrically operated type and includes a solenoid operated valve which is energized from an ECU, shown schematically and indicated by the reference numeral 38, in accordance with a control strategy as will be described.

The fuel injector 37 receives fuel from a fuel supply system that includes a remotely positioned fuel tank 39. The fuel tank 39 feeds a supply conduit 41 in which a filter 42 is provided. The filter 42 is provided upstream of a high-pressure fuel pump 43 that delivers pressurized fuel to a fuel rail 44. The fuel rail 44 in turn supplies fuel to the fuel injector 37 through a supply 45.

The pressure at which the fuel is supplied to the fuel injectors 37 is controlled by a pressure regulator 46 that communicates with the fuel rail 44. This pressure regulator regulates pressure by dumping excess fuel back to the fuel tank 39 through a return line 47.

In addition to controlling the timing and duration of injection of fuel by the fuel injectors 37, the ECU 38 also controls the firing of spark plugs 48. The spark plugs 48 are mounted in the cylinder head assembly 14 and have their gaps extending into the cylinder head recesses 15.

The burnt charge from the combustion chambers 15 is discharged through an exhaust system, indicated generally by the reference numeral 49. This exhaust system 49 includes exhaust passages 51 formed in the cylinder head assembly 14. These cylinder head exhaust passages 51 are controlled by poppet-type exhaust valves 52. The exhaust valves 52 are operated by means that include an exhaust camshaft 53 that is mounted in the cylinder head assembly 14 and which, like the intake camshaft 36, is driven at one-half crankshaft speed by a suitable timing mechanism.

The cylinder head exhaust passages 51 communicate with an exhaust manifold 54 which collects the exhaust gases and delivers them to a three way catalytic converter 55 in which a three-way catalyst is provided. The catalytic converter 55, in turn, communicates through a tailpipe 56 and muffler 57 to the atmosphere for the discharge of the treated exhaust gases.

The engine 11 is also provided with an exhaust gas recirculation (EGR) system. This exhaust gas recirculation system includes an exhaust gas recirculating conduit 58 that extends from the exhaust system 49 between the catalytic converter 51 and muffler 57, and the intake manifold plenum chamber 31. The amount of exhaust gas which is recirculated is controlled by an EGR valve 59 which, in turn, is controlled by the ECU 38.

The engine 49 is also water cooled, and to this end, the cylinder block 12 and cylinder head assembly are provided with cooling jackets 61 through which a liquid coolant is circulated. This liquid coolant is circulated by a coolant pump (not shown), and also passes through a heat exchanger which is also not illustrated. Like the other portions of the engine already described, the cooling system may be of any conventional type, and for that reason, further description of it is not believed to be necessary to permit those skilled in the art to practice the invention. This invention relates primarily to the control methodology and engine control system. The sensors and other engine associated components of this construction will now be described by particular reference still to FIG. 1.

The engine 11 is provided with a number of sensors for sensing engine running and ambient conditions. Among these is a crankcase position sensor which is comprised of a timing gear 62 that rotates with the crankshaft 18 and which cooperates with a pulser coil 63 that outputs pulse signals to the ECU 38. These pulse signals provide an indication of not only the angle of the crankshaft 18, but also by counting the number of pulses and dividing them by the unit of time, it is possible to measure the rotational speed of the crankshaft 18.

There is also provided a sensor for ambient air pressure, and this pressure sensor, indicated by the reference numeral 64, is provided in the air inlet device 22 downstream of the filter element 24. In addition, an air flow meter, for example an electrically heated wire-type of device 65, is provided in the intake passage 25 for measuring the total mass air flow to the engine.

The throttle valve 27 has associated with it a throttle position sensor 66. This sensor 66 provides the ECU 38 with information regarding operator demand or load on the engine. There may also be provided an accelerator position sensor (not shown) for "fly by wire type systems."

Intake manifold vacuum, another indicator of engine load, is measured by a pressure sensor 67 which is disposed in the intake manifold 32, and specifically its plenum chamber portion 31.

In accordance with an important feature of the invention, in-cylinder pressure is also sensed by an in-cylinder pressure sensor 68 which is mounted in the cylinder head 14 in communication with the combustion chamber recess 15 formed therein.

A temperature sensor 69 is also mounted in the cylinder head assembly 14 and senses the engine temperature. There may also be provided in the cylinder head a knock sensor that senses knocking conditions by measuring vibrations of the engine, as is well known in this art.

In order to permit feedback control of the engine to maintain the desired fuel-air ratio, an oxygen sensor 71 is provided in the exhaust manifold 54 in close proximity to the cylinder head exhaust passages 51.

The catalytic converter 55 is provided with a converter temperature sensor 72 that senses the temperature in the catalytic converter and that of the catalytic bed therein. A temperature sensor 73 is also positioned in the exhaust pipe 56 for sensing exhaust temperature downstream of the converter 55.

Finally, the control for the engine includes a main switch 74 that is operative to switch on and off not only the ECU 38, but also the ignition system controlled by it for firing the spark plugs 48. Also, the operation of the fuel injector 37 is discontinued when the main switch 74 is turned off. The condition of the main switch 74 indicates, obviously, the operational state of the engine 11 (on or off).

Basically, the way this system operates to control the engine 11 is to measure the rate of combustion or percentage of total combustion which has occurred in the combustion chamber in relation to crank angle. By measuring this, it is possible to determine the engine running condition, and then the engine running condition can be altered by altering certain parameters to change the rate of combustion.

The rate of combustion can be controlled in two manners. The first of these is by controlling the timing of the beginning of combustion. In spark-ignited engines this is done by controlling the timing of the firing of the spark plug. In diesel engines this is done by controlling the timing of the beginning of direct cylinder fuel injection.

In addition to controlling the timing of beginning combustion, the rate of combustion can be controlled during the engine running cycle and during a specific cycle thereof by changing factors which will affect the rate of combustion. This can be the duration and amount of fuel injected or fuel supplied, and the amount of exhaust gas recirculation employed. Various other ways may also be employed to practice the invention by changing the start of combustion and the rate of combustion during the cycle.

It has been found that the rate of combustion can be quite accurately computed by measuring the pressure in the combustion chamber at certain times during the cycle, as will now be described by particular reference to FIG. 2.

Figure 2:
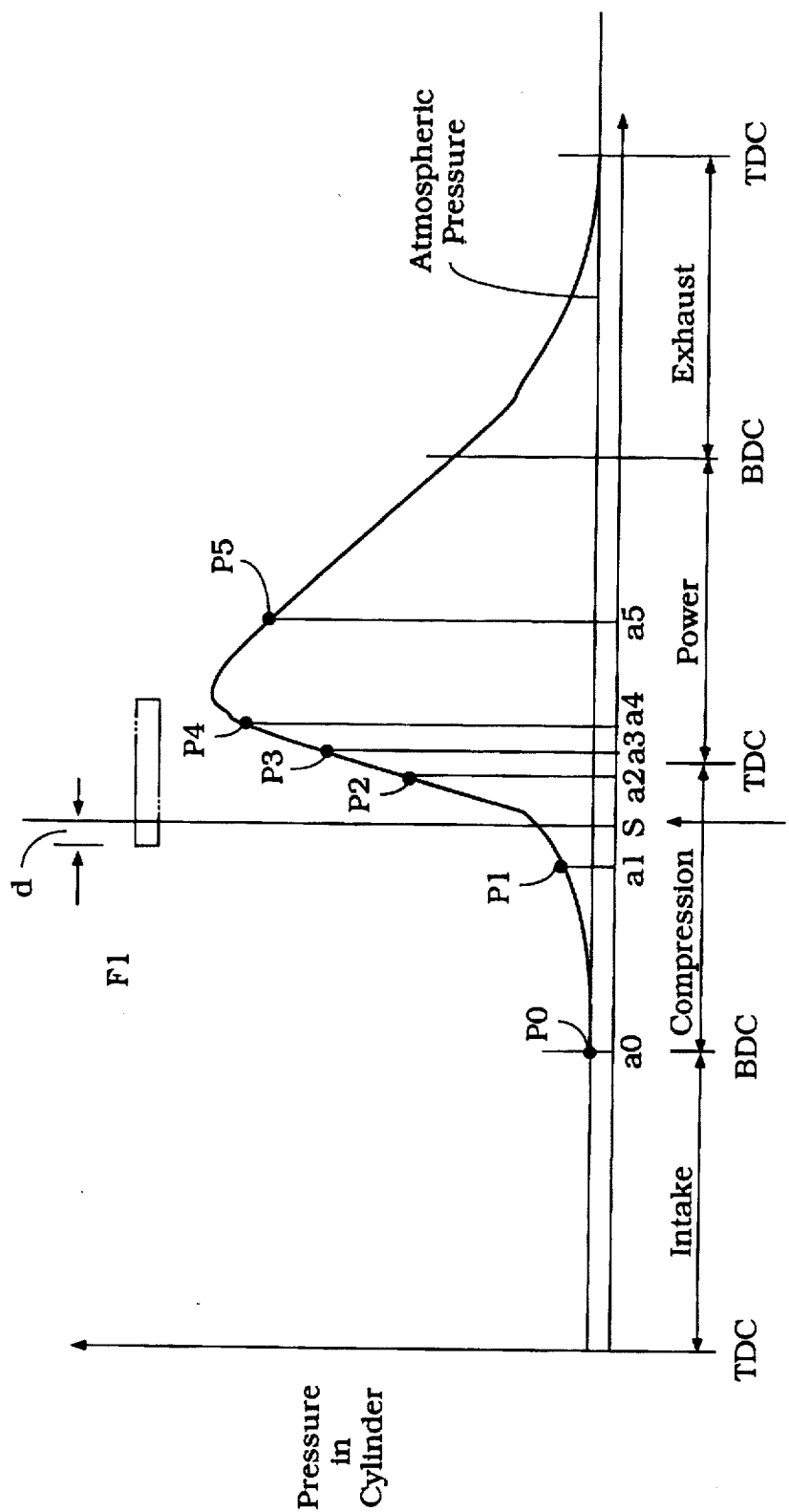
FIG. 2 is a pressure time curve of the engine shown in FIG. 1 during a complete cycle of operation, and shows the various sampling points at which in cylinder pressures may be taken in accordance with this invention.

FIG. 2 shows the sampling points which may be taken in order to calculate, in the manner to be described, the rate of combustion or the percentage of combustion which has occurred. Rate of combustion is determined as the rate of combustion of the fuel burned in one combustion cycle up to a certain specific crank angle. The amount of combustion which occurs can be done with a first order approximation equation. Another method would be to determine the rate of combustion up to a specific crank angle, for example, top dead center, computing heat production using samples of the combustion pressure and a thermodynamic equation. Both methods yield computed results that closely approximate the real values.

Because of the fact that combustion begins generally before top dead center, under some if not all portions of running, the combustion pressure acts against rather than with the piston. Also, the beginning of combustion is varied both with spark and diesel engines by varying, respectively, the spark and injection timing. Thus, combustion pressure signals only measured after top dead center will not account for variations in the timing of beginning of injection or a beginning of combustion. Therefore, in accordance with an important feature of the invention, the combustion chamber pressure is measured at a crank angle that is before top dead center at a time between the end of the exhaust stroke and the beginning of the compression stroke. In addition, subsequent measurements, as will be described, are taken, and then these are utilized for determining the burned fuel rate and also controlling the engine, as will be described.

The position where the first reading is taken is at the ending of the exhaust stroke and the beginning of the compression stroke, before top dead center in the vicinity of top dead center in a four-cycle engine, is different for a two-cycle engine. Specifically, in four-cycle engines, after firing, the exhaust stroke begins from the bottom dead center and continues until the top dead center, where the pressure in the combustion chamber has dropped to near atmospheric pressure. In the intake stroke just past top dead center, the pressure is maintained at near atmospheric levels as the fresh air is being introduced. Just past the succeeding bottom dead center, the pressure begins to gradually increase on the compression stroke. Therefore, the pressure in the combustion chamber needs to be taken at a point that is within the range where the pressure in the combustion chamber is at its lowest level and near atmospheric pressure.

In two-cycle engines, on the other hand as will be described in more detail later, after firing, the piston descends and the pressure declines. When the exhaust port is opened, the pressure in the combustion chamber drops further. When the scavenging port subsequently opens, new air is introduced, and the pressure is near atmospheric. The exhaust port remains open at the bottom dead center, and as the piston rises, the scavenging port is closed, and then the exhaust port is closed. Compression then begins, with the pressure gradually rising as a result. Thus, where the term "between the end of the exhaust stroke and the beginning of the compression stroke" is referred to, that is the interval after the exhaust port has opened and exhausting has begun, and when the scavenge port is opened and after the intake air has begun.

Thus, in accordance with the invention, the pressure is detected at a plurality of points during each combustion cycle at a crank angle between the conclusion of the exhaust stroke and the beginning of the compression stroke, at a crank angle that is near but before combustion starts, at a crank angle after combustion has been initiated but still before top dead center, and at crank angles near but after top dead center.

These points of reading may be best understood by reference to FIG. 2, which is a combustion chamber pressure/crank angle trace for the engine shown in FIG. 1, under a particular running condition. It is seen that the reading P0 is taken at bottom dead center position, which can be characterized as the point a0, and this is the point after exhaust has been completed and where the piston crosses over from the end of the intake stroke to the beginning of the compression stroke. It should be noted that the actual valve timing will, of course, vary slightly from the opening at top dead center and closing at bottom dead center, so as to allow for the inertial effect.

One further reading P1 is taken of pressure at a point a1 that is before top dead center, but after firing of the spark plug, as shown in FIG. 2. Four additional readings (P2–P5) are taken, three of which occur before the pressure in the cylinder reaches it peak pressure. One of these is taken at the point P2 before the piston reaches top dead center. Two further readings are taken after top dead center but before peak pressure is reached. A final reading is are taken after peak pressure, but well before the piston reaches its bottom dead center position and at approximately one-half of the piston stroke.

Although the example thus far described deals with a spark-ignited engine having the ignition timing noted at the point S in FIG. 2, the same sampling points also can apply with diesel engines. The diesel engine characteristics are also shown in this figure where the fuel injection period is indicated by the phantom area FI. It will be seen that fuel injection begins at an offset angle d before ignition actually occurs at the point S.

As is well known with diesel engines, the fuel injection continues during the burning process until adequate fuel has been supplied to achieve the desired power output. However, the sampling points are the same; that is, there are four sampling points taken after ignition occurs.

By measuring the pressures at the four points during the combustion process and the two points before the combustion process is begun, it is possible to actually calculate the combustion rate qx in accordance with the following linear approximation formula:

$$qx=b+b1(P1-P0)+b2(P2-P0)+ \ldots bn(Pn-P0)$$

In the foregoing example, P5 is taken at the crank angle a5. In a similar manner, it is possible to calculate indicated mean effective pressure PMI in accordance with the following formula:

$$PMI=c+c1(P1-P0)+c2(P2-P0)+ \ldots cn(Pn-P0)$$

In the foregoing equations, the values of b and c are constants of predetermined value that are determined experimentally. The actual pressures are the measured pressures P1, P2, etc., minus the assumed atmospheric pressure p0.

Thus, by a simple first order approximation equation, the amount of fuel burned at a specific crank angle after ignition and combustion rate can be determined. This is utilized to control the engine, as will be described hereinafter, to obtain the desired performance. This permits the use of better engine operation and prevents the generation of $NO_x$ emissions caused by rapid advance of combustion.

A second computation method for combustion rate can be computed using the heat generated between two pressure measurement points. The pressure difference $\Delta P$ between the two measurement points and the volume difference $\Delta V$ in the volume of the combustion chamber are measured. The following equation is utilized to determine the actual heat generated Qx:

$$Qx = A/(K-1) \times [(K+1)/2 \times \Delta P \times \Delta V + K \times (P-PO)]$$

In this equation, A is the heat equivalent, K is a specific heat ratio. PO is the pressure at bottom dead center, as aforenoted.

The specific pressure measurement point up to where combustion rate is measured should be selected as the crank angle where combustion is nearly complete. Similarly, a crank angle near the point of ignition would also be selected as a pressure measurement point. The calculation of the foregoing amount of heat generation qx is performed by summing the values determined for each pressure measurement point. With regard to the interval between the initial pressure measurement point to the specific pressure measurement point (the specific crank angle), the combustion rate is determined by summing the foregoing q and then dividing; that is:

combustion rate qx=the amount of combustion heat up to the desired crank angle/all of the heat×(100%)

$$qx = (Q1+Q2+ \ldots +Qx)/(Q1+Q2+ \ldots +Qn) \times 100$$

This value can also be taken for the value utilized to perform engine control.

Figure 3:
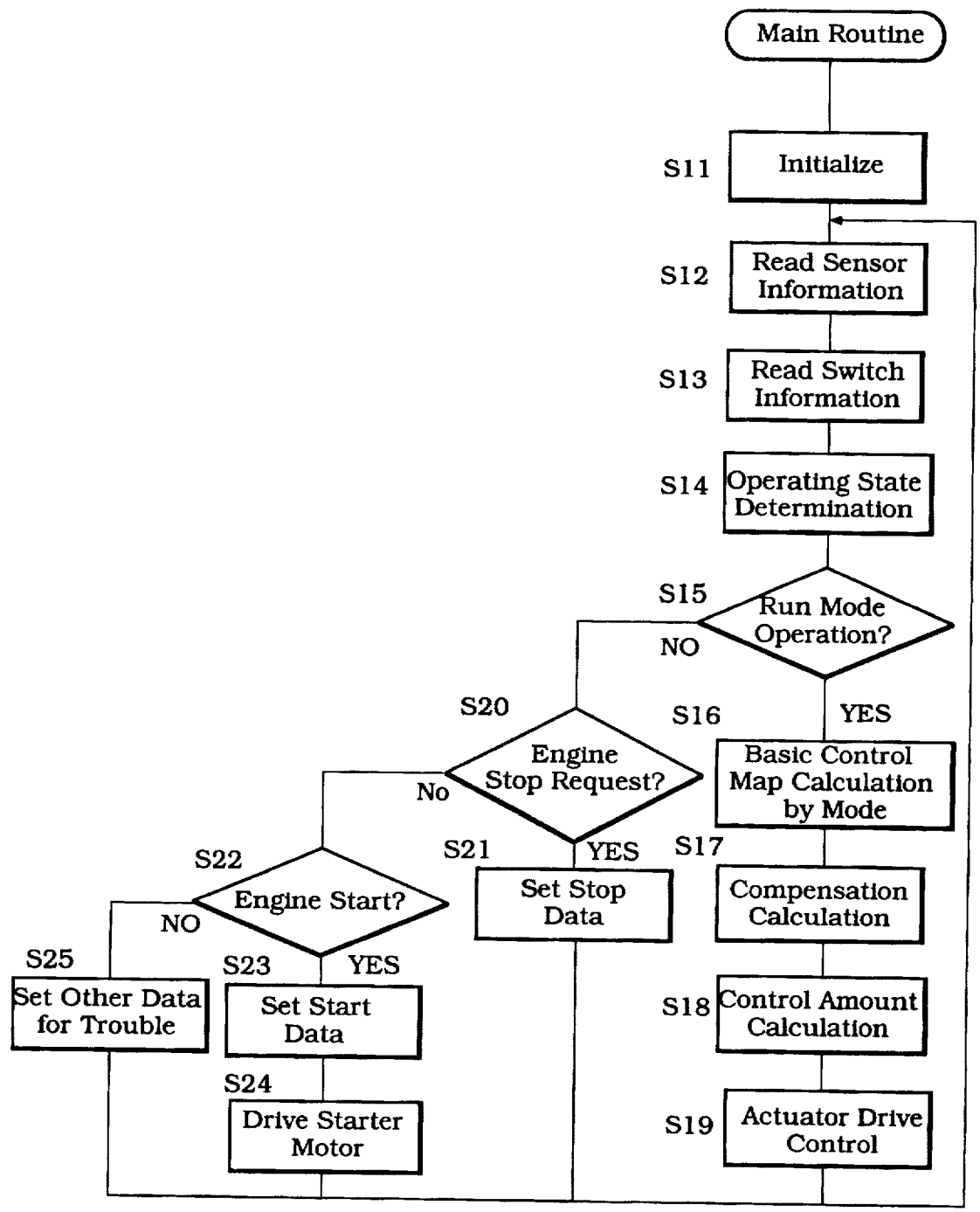
FIG. 3 is a block diagram showing the main control routine during initialization and startup.

Referring now to FIG. 3, the flow chart for basic operation of the various control routines will be described. The program begins and moves to the step S11 so as to initialize the system. This is done on initial starting of the ECU 38, and in this step, all the initial values of the various controls are set to their flag values and their variables. The program then moves to the step S12 so as to read the outputs of the various engine sensors. This includes taking the reading of the intake air pressure from the air pressure sensor 64, measuring the intake air flow from the air flow sensor 65, measuring the temperature of the intake air from an appropriate temperature sensor, measuring the throttle valve opening from the position of the throttle position sensor 66, and measuring the induction system vacuum from the sensor 67. The catalyst temperature is read from the temperature sensor 72; the crank angle is read from the crank angle sensor 63; the engine temperature is measured from the temperature sensor 69; and the output of the oxygen sensor 71 is also read. All of the other sensors' readings are taken, and the data is stored in the memory of the ECU 38.

The engine load can be determined from the position of the throttle sensor 66 and/or the intake air amount or the manifold vacuum.

At the step S13 the condition of the main switch 74 is read. Also, if there is a starter switch, this output reading can be read. In engines having a kill switch, the output of the kill switch is also read.

The program then moves to the step S14 to determine the operational state of the engine. This operational state is determined from the sensor information taken and may be of one of ten operational states. These states are as follows.

Operational State 1 Normal Operation or Best Torque

This state is a normal operating state and one which there is a constant throttle valve position, or the throttle valve position is within the medium- to high-speed condition with medium and high load without rapid acceleration or deceleration. This is also a condition when the throttle opening is not less than a predetermined minimum value, and the engine speed is not less than a predetermined minimum value. The rate of change of position of the throttle valve 27 sensed by the sensor 66 is not changing more rapidly than a predetermined amount. This operational state is determined as the minimum advanced ignition for best torque control state, and a value of 1 is stored for this variable value C in the memory. This is the best torque control system, which will be described later.

Operational State 2—Transient Control State

This is the state when the throttle opening rate is greater than the predetermined noted minimum value. This is a state when the condition is transient, and a value of 2 is stored as the variable C in the memory.

Operational State 3—Lean Burn State

This is a state when the throttle opening is not more than a predetermined value, and the engine speed is within a specific midrange speed such as 2,000–5,000 rpm. In this state the engine is run in a lean combustion control state, as will be described later, and a value of 3 is stored as the variable C in the ECU.

Operational State 4—Abnormal Operational State

This is the condition when the engine is in an abnormal state; that is, the engine speed is less than a predetermined speed, which may be a speed lower than idle speed or greater than a predetermined maximum speed. The engine temperature may be less than the desired operating temperature or in an overheat condition. Also, other factors such as low oil pressure, etc., may be sensed and indicated as this state. If this state exists, the value 4 for this state is stored as the variable C in the memory of the ECU 38.

Operational State 5—Cold Start

This is the state when the engine temperature is below a predetermined value and the starter switch is on. This is determined as a cold starting state, and the cold starting routine, to be described later, is employed. A value 5 for this state is stored as the variable C in the memory.

Operational State 6—Stop

This is the operating condition when the main switch 74 is off or a kill switch, if there is one, is turned on to stop the engine. This is determined as a request to stop the engine, and the value 6 is stored as the variable C in the memory.

Operational State 7—Idle Mode

This is a condition when the clutch is in a disengaged state or the transmission is neutral and/or the engine speed is below a given value. This also may be a condition when an idle switch (a switch which indicates that the throttle valve 27 is in its fully closed position). Then it is decided that the engine is in idle mode. In this condition, the value 7 is stored as the variable C in the memory.

Operational State 8—EGR Control

This is the condition when the switch controlling the EGR control, that is, the control valve 59, is open and exhaust gases are being recirculated into the intake system. When this is the condition, the program goes to an EGR control mode, as will be described later, and the value 8 is stored as the variable C in the memory of the ECU 38.

Operational State 9

This is a warm start condition. That is a condition when the engine temperature sensed by the temperature sensor 69 is above a predetermined value and the starter switch is on.

This is decided as a warm engine start, and the value 9 is stored in the variable C of the memory of the ECU 38.

Operation Condition 10—Knocking Condition

This is a condition when an abnormal pressure rise or abnormal pressure transition in the combustion chamber prior to ignition is detected from the pressure sensor 68. Also, this can be sensed by the output of a knock detector, although that is not necessary, since there is the pressure sensor. Thus, under this condition a potential knocking condition is determined, and the value 10 is set in the memory C of the ECU 38.

After completing the step S14 and on subsequent repeats of the control routine of FIG. 3, the variable C is checked with the previously measured variable, and if it is the same, a flag p=1 is not changed. If, however, the value exceeds a specific value r, then the flag is set to p=0. The program then moves to the step S15 to determine whether the run mode is operational or not. That is, it is determined whether to perform a mode operation or normal operation.

If at the step S15 the variable C is 1, 2, and/or 3, the program proceeds to the step S16. If it is not, and the variable is 4, 5, or 6, it goes to the step S20.

At the step S16 the program determines the value of the flag p. When p=0, a target combustion ratio corresponding to the engine speed and load is determined from the map data in the memory corresponding to those of FIG. 6. And the result is stored in a further memory d. A basic ignition timing, basic fuel injection start timing, and basic fuel injection amount are also determined from the map data in a memory, which are similar to those of FIG. 6 where the relative values are given as a function of engine speed and load. These basic ignition timing, basic fuel injection start timing, and basic fuel injection amount are stored in memories E'(1), E'(2), E'(3), respectively. After these memories are set, the flag p is set to 1.

If p=0 and if the variable C is 5, then there is also determined a target burning rate according to the target burning rate map for cold start, and that value is stored in the memory d. Once p is set to 1, the program moves to the step S17.

At the step S17, the intake air temperature and intake vacuum signals are utilized to determine a compensation calculation in the amount of fuel to be injected. If the intake air temperature is higher than that which has been utilize to generate the map for the fuel injection amount, then the air is less dense, and a decrease in the amount of fuel supplied is necessary. Also, if the intake air pressure is greater, then the air density increases, and an increase in fuel injection amount is necessary.

The program then moves to the step S18 so as to set the control amount of fuel to be injected from the basic amount and the compensation. The program then moves to the step S19 so as to effect fuel injection by setting the timing for fuel injection and the timing for fuel injection duration. Similar corrections are made for ignition timing in the steps S17 and S18. These factors are then stored in the aforenoted memories.

Then, at the step S19 at the appropriate times, the spark ignition timing is set to occur in the calculated corrected amount, and the fuel injection timing and duration are set to occur in the aforenoted corrected amount and times.

If at the step S15 the running mode operation was set in the range where C is greater than 4, then the program moves to the step S20. At the step S20 it is then determined if the engine stop has been called for. This is determined by either or both of the conditions of the main switch 74 and the kill switch, if one is provided. If the main switch is switched off and/or if the kill switch is switched on, it is determined that the engine is in the stop mode.

If at the step S20 it is determined that the engine is in the stop mode, the process moves to the step s21 wherein the values of the E register are set as zero as the stop data. The engine is then stopped.

If, however, at the step S20 it is determined that the engine is not in the stop mode condition, the program moves to the step S22. At the step S22 it is determined whether the engine is in a starting mode. The engine is determined to be in a starting mode if the starter switch (not shown, but previously referred to) is turned on. If it is, the program moves to the step S23 so as to set the starting data from the memory. This is the information that has been set in the memory F1. The program then moves to the step S24 so as to energize the starter motor and to start the motor with the starting settings being accomplished.

If at the step S22 it is determined that the starter motor has not been energized, then the program moves to the step S25. If also at the step S22 it is determined that the engine is not in the engine start mode, the program moves to the step S25 to obtain from the memory F1 the data of the type of abnormal control that is required, and that control routine is followed.

The interrupt routine which occurs when a specific crank angle setting occurs will now be described by reference to FIG. 4. This interrupt routine is performed by interrupting the main control routine, as shown in FIG. 3, and proceeding to the routine shown in FIG. 4. The program begins and moves to the step S111 so as to set the timer to perform the interruption routine at the specified crank angles; namely, the next crank angle which has set.

The program then moves to the step S112 so as to record the crank angle at which the interruption occurred in memory.

At the step S113 it is determined if the data at every crank angle at which interruption is to occur has been taken into the memory. If it has not, the program repeats. If, however, at the step S113 it is determined that the data for all interrupts has been taken, the program then moves to the step S114 to determine if the value of C is equal to 10, this being the value set for abnormal burning or knocking conditions. If this is the condition, the program moves to the step S115 so as to perform the knocking prevention routine, as will be described later and the program then repeats.

If at the step S114 it has been determined that the value C is not 10, the program moves to the step S116 to see if the value has been set at C=2. This is to determine whether the engine is in the aforenoted transient operating condition. If it is, the program moves to the step S116-a so as to perform the transient control routine, as will be described later, so as to correct ignition timing and air-fuel ratio accordingly. Otherwise, the program returns.

If at the step S116 it is determined that there is not a transient condition, the program moves to the step S117 to see if the value of C set in the memory is 5. This is determine whether the engine is in a cold start mode. If the engine is operating in the cold start mode, as determined at the step s117 because the value of c is 5, the program moves to the step S117-a to correct engine ignition timing and/or injection amount, as will be described, and the program then returns.

If at the step S117 it is determined that the engine is not in the cold start mode, then the program moves to the step S118 to see if the value of C has been set at 8. This is to determine if the engine is in the EGR control mode. If so, if the program moves to the step S118-a, so as to initiate EGR at the appropriate rate and adjust ignition timing, as will be described later, and the program moves to the step S119.

At the step S119 it is determined to see if the engine is running in a lean burning mode state. This is done by determining if the value of C in the memory is set at 3. If it is, the program moves to the step S119-a so as to set the engine in a lean burn control routine so as to correct the air-fuel ratio and ignition timing, as will be described later. The program then returns.

If, however, at the step S119 it is determined that the engine is not in the lean burn mode, the program then moves to the step S120 to determine if the engine is operating in the idle mode. This is done by determining from the memory if the value C is set at 7. If it is, the program moves to the step S120-a to perform the idling control routine so as to correct the air-fuel ratio and ignition timing and return.

If none of these different from normal conditions is found in the proceeding through the steps down through the step S120, the program moves to the step S121 so as to perform the maximum torque control routine and corrects the ignition timing accordingly and returns. This is the operational state 1 previously referred to.

Figure 5:
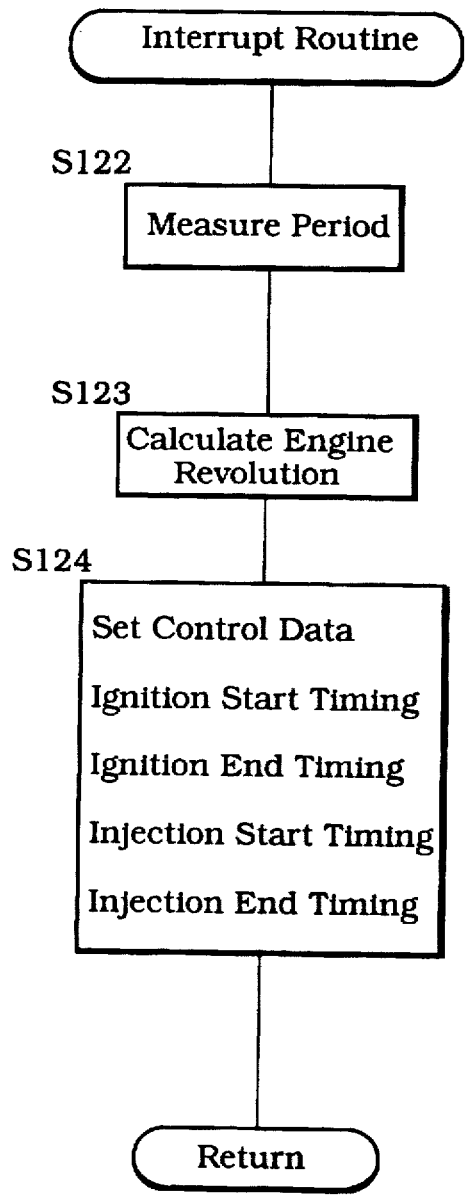
FIG. 5 is a block diagram showing another portion of the interrupt control routine wherein the engine data is taken and settings made.

The interrupt routine will now continue to be described by reference to FIG. 5 where a specific interrupt routine occurs and begins at the step S122 so as to set a measuring period during which the crank angle of engine rotation is measured. The program then moves to the step S123 so as to calculate the engine speed from the crank angle change per time. The program then moves to the step S124 so as to set the target values for ignition start and stop timing, injection start timing, and injection end timing, all set to the control data of the memory f in the registers f1–f4 accordingly. The device then operates so as to set these times.

Figure 6:
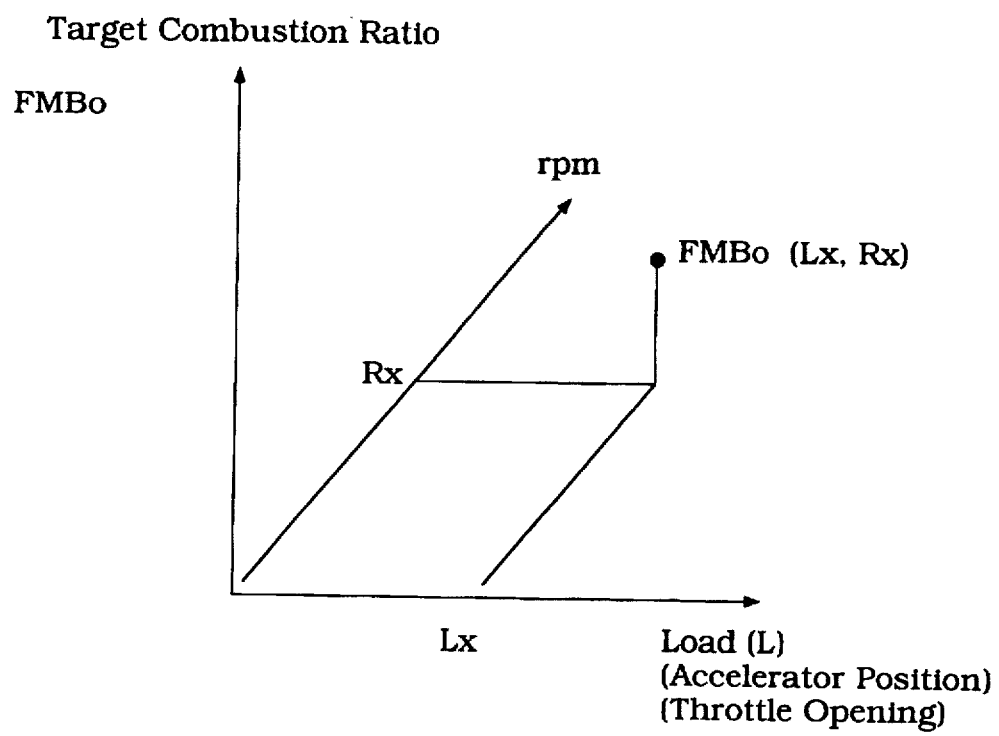
FIG. 6 is a graphical view showing the a three dimensional map of the relationship of the target combustion ratio (FMBo) with respect to load as determined by accelerator position and/or throttle opening and engine speed.

FIG. 6 is a graphical view that shows how it is possible to determine the desired or target combustion ratio depending upon engine speed Rx and load Lx. Load is determined in the illustrated embodiment by either accelerator position or throttle opening. This map is a three-dimensional map for determining combustion ratios for specific crank angles; for example, up to top dead center, 10 degrees before top dead center, and so forth. So, under a specific condition of engine speed Rx and engine load Lx, the target FMB is determined at FMBo for these coordinates. Once the target has been determined in the describe manner, then the system can check and determine whether the target condition has been met, and if not, how it should be adjusted.

Figure 7:
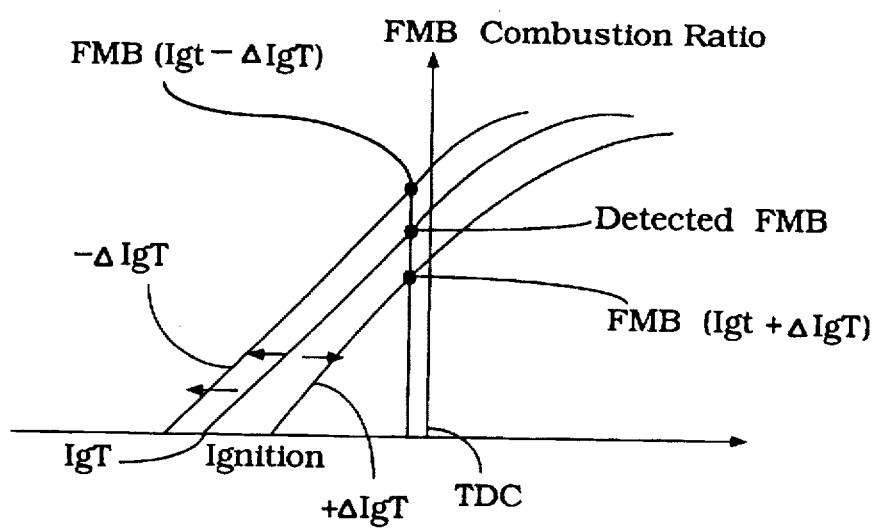
FIG. 7 is a graphical view showing how the FMB curve can be adjusted by changing the start of ignition timing.

FIG. 7 is a graphical view showing how the combustion ratio can be adjusted to maintain the desired value at a given crank angle. This chart assumes that the curves of combustion ratio are a family of like-shaped curves having different starting points depending upon the time when ignition occurs. The point IGT indicates the desired curve, with the appropriate FMB being set at the point indicated on that curve.

If the actual measured FMB is lower than this, then it is necessary to advance the ignition timing by an amount ΔIGT to achieve the desired value. However, if the desired value is too high, then it is necessary to retard the ignition timing by the amount ΔIGT in order to bring the FMB to the desired ratio. As will be described later, it is possible to also make other adjustments than changing the timing of the ignition in order to adjust not only the point of the curve, but actually the shape of the curve of FMB versus crank angle.

Figure 8:
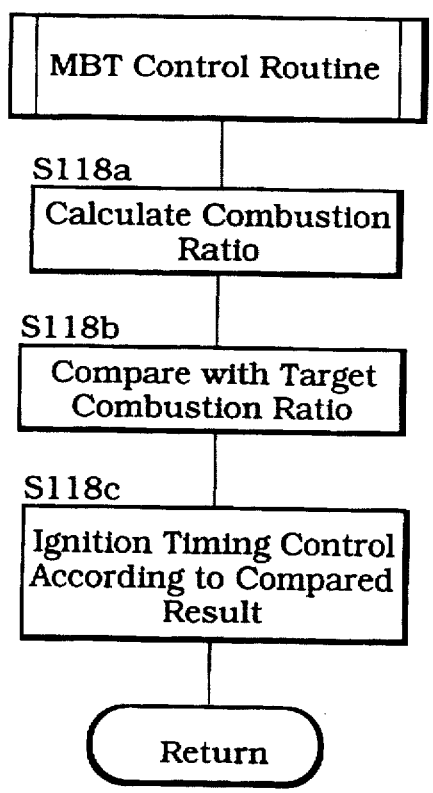
FIG. 8 is a block diagram showing the control routine utilized to obtain ignition timing control in order to achieve the desired FMB.
Figure 9:
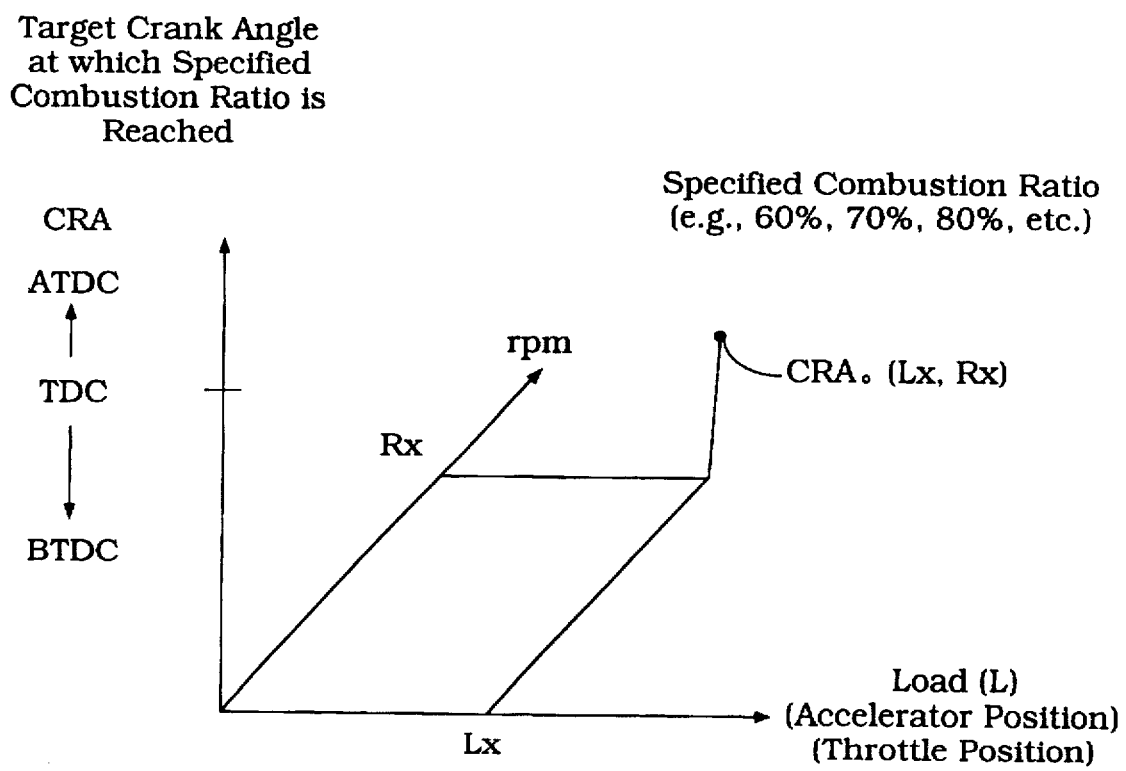
FIG. 9 is a graphical view, in part similar to FIG. 6, and shows a three dimensional map used when a target crank angle at which the target combustion ratio is accomplished.
Figure 10:
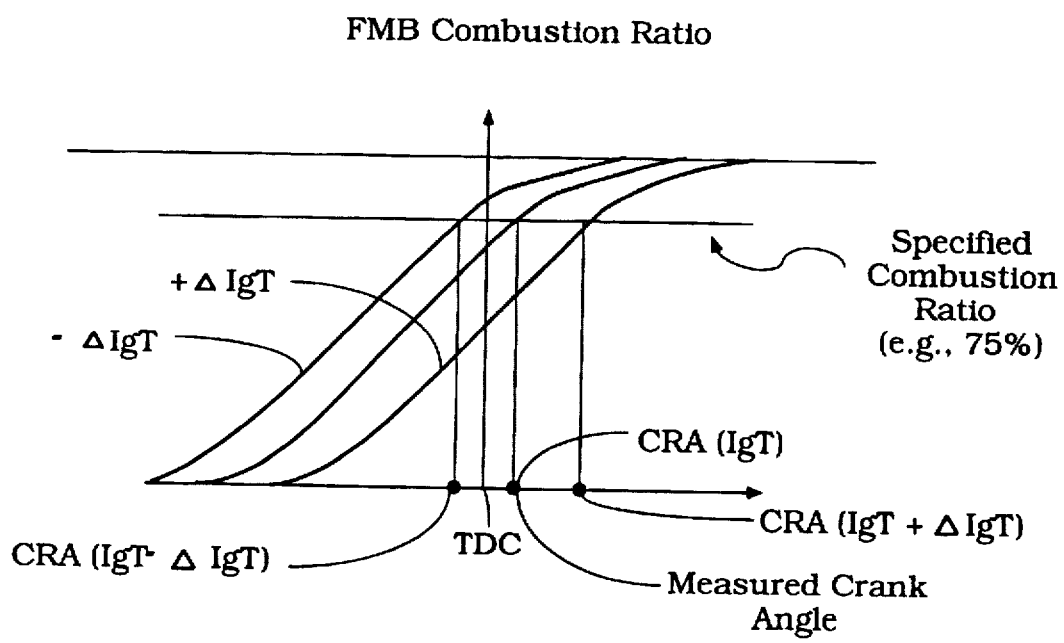
FIG. 10 is a graphical view showing how the ignition timing can be utilized to obtain the desired target FMB at the desired crank angle.

Turning now to a specific performance goal, and specifically that which achieves the maximum torque, i.e., the normal control routine which is followed at the step S121 in FIG. 4, the way in which this will be accomplished will be described by primary reference to FIG. 8. This chart may also be understood by reference to FIGS. 9 and 10. FIG. 8 shows the control routine; FIG. 9 shows one of the three-dimensional maps in order to obtain the desired FMB at a specific crank angle; and FIG. 10 shows how the corrections can be made to achieve this result.

Referring now specifically to FIG. 8, the program begins the MBT control routine and moves to the step S118-a wherein the combustion ratio is calculated in accordance with the formula previously described by measuring the combustion chamber pressure at the selected points.

The program then moves to the step S118-b so as to compare the measured combustion ratio with the target combustion ratio. FIG. 9 shows the target combustion ratio map, and this map is set for various lean burn rates, such as 60%, 70%, and/or 80% of stoichiometric. Again, the pressure at a specific point is compared with the target pressure for the given engine speed and crank angle.

The program then moves to the step S118-c so as to vary the ignition timing to achieve the desired curve. As seen in FIG. 10, the appropriate pressure for FMB operation is provided by the normal curve. And if the curve at, for example, 75% lean burn is chosen, then the correct FMB is set by either advancing or retarding the timing of ignition, as set at ΔIGT. Again, this assumes that the curves of FMB are substantially similar in configuration when only the ignition timing is varied.

It should be noted that although the invention has been illustrated in conjunction with a fuel injected engine, the adjustments to obtain MBT can also be achieved with a carburetor wherein the fuel supply amount and timing cannot be varied as with a fuel injected engine. Of course, carbureted engines do not permit as wide a latitude of adjustments to be made, but nevertheless some of the advantages described herein can be achieved with carbureted engines where the FMB curve can be controlled by changing ignition timing.

The control routine for obtaining lean burn will now be described, beginning with reference initially to FIG. 11. This lean burn control routine is the control routine that is employed when operating under this mode, indicated by the step S119-a in FIG. 4.

When entering into this control routine, the program moves to the step S201 to calculate the burning rate FMB (θ). This is done so as to calculate the burning rate at a given crank angle θ.

Once the target value of the burning rate is determined from a map like the maps of FIGS. 6 and 9, then the program moves to the step S202. At the step S202 it is determined whether the ignition timing required to be corrected has been accomplished. That is, this particular control operates to adjust not only ignition timing, but also fuel supply amount. The adjustments are made so that ignition timing is adjusted first, and then fuel supply amount is adjusted. Assuming that the correct ignition timing has been set at the step S202, the program then moves to the step S203. At this step it is determined if the actual burning rate FMBθ is greater than or equal to the target FMB, this being expressed as FMBX. If it is, the program moves to the step S204.

At the step S204 the fuel supply correction factor FTD is decreased incrementally by a fuel supply corrector amount FTDD, and the program then moves to the step S206.

If at the step S203 it is found that FMBθ is not greater than or equal to FMBX, then the amount of fuel supplied FTD is increased by an increase corrective amount FTDI. The program then moves to the step S206.

At the step S206 the frequency of expected ignition control FCMAX to a counter F counter is set, and in accordance with the ratio, and the program returns.

Figure 13:
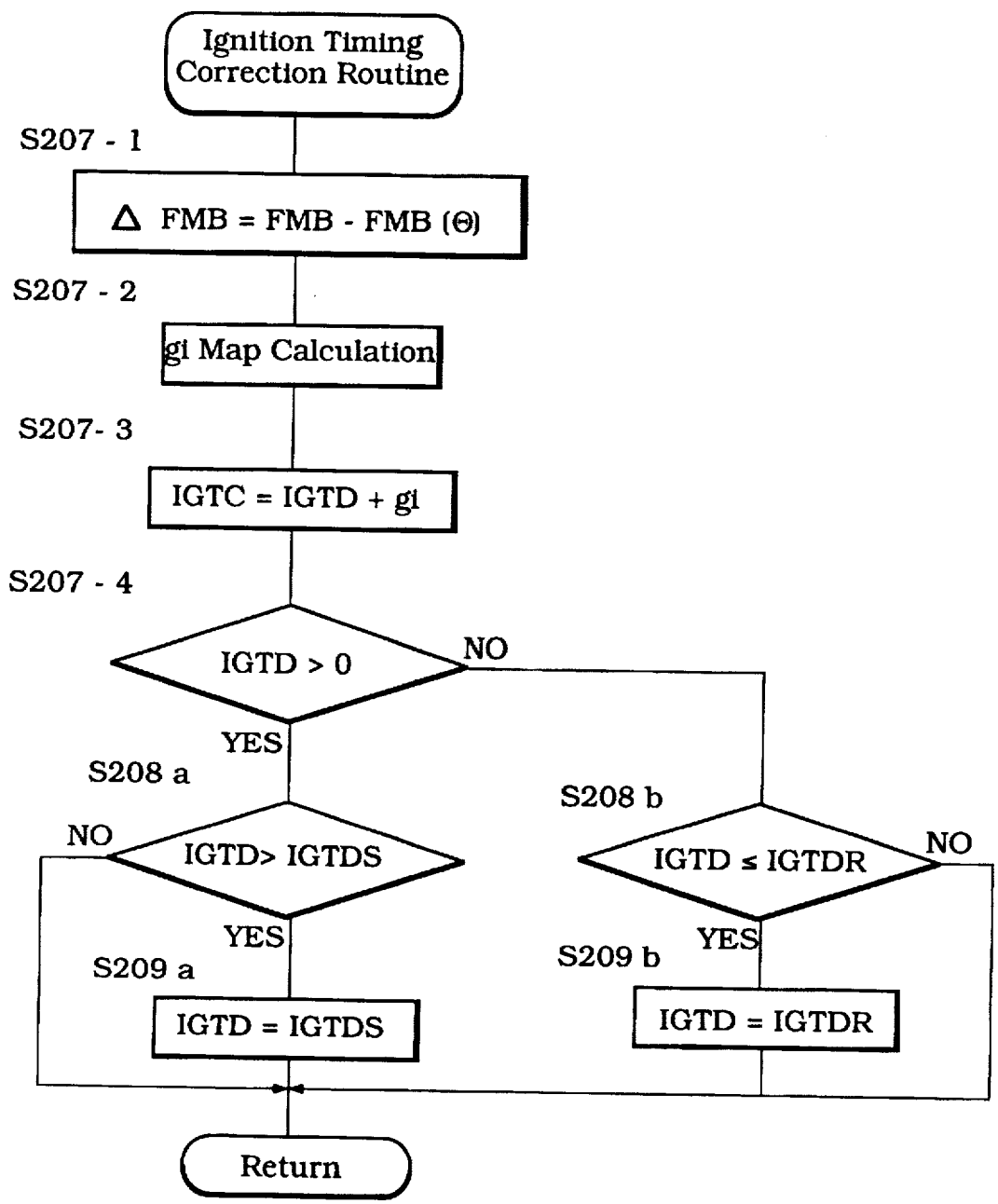
FIG. 13 is a block diagram showing the control routine to control the ignition timing to obtain the desired lean burning or selected other running condition.

The spark advance control is achieved if not found to be correct at the step S202 at the step S207. This is done in accordance with the control routine which is shown in FIG. 13. After the control routine has been accomplished, the program moves to the step S208 so as to subtract one from the count of the counter F and the program returns.

Figure 12:
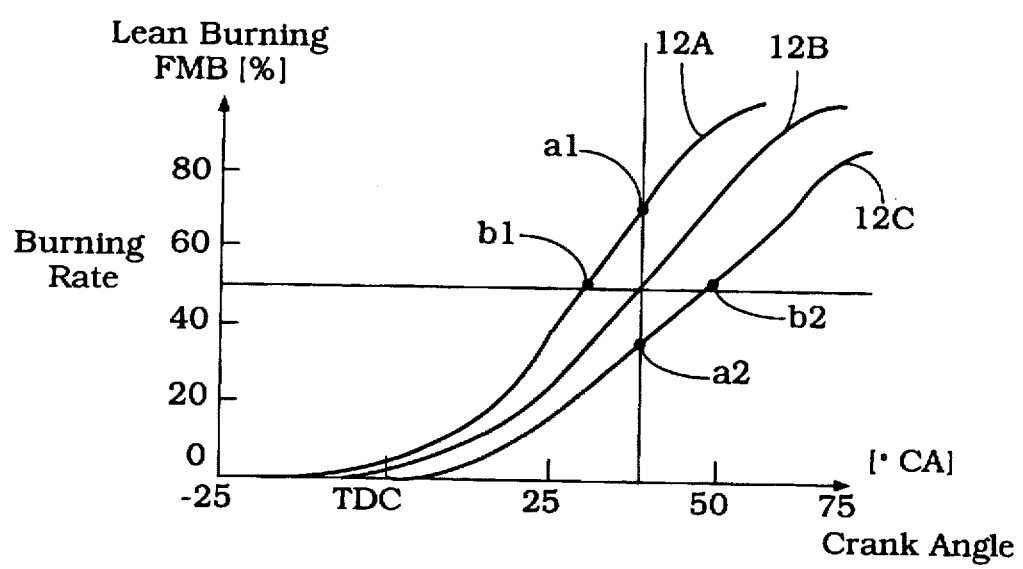
FIG. 12 is a graphical view showing the relationship of crank angle to burning rate in order to obtain the desired lean burning or other running condition.

FIG. 12 is a graphical view showing how the percentage of FMB can be varied in response to crank angle by changing the fuel supply amount. The curves 12A, 12B, and 12C indicate curves which show how the burning rate is varied as the mixture moves from richer to leaner, with the Curve 12A being the richest, while the curve 12C is the leanest. Thus, if the desired ratio is that shown by the curve 12B, and at a given crank angle, such as indicated by the vertical line, is greater than the target burning rate, as indicated by the point 12A, the fuel supply is decreased to make the mixture leaner and to achieve the desired value. On the other hand, if the mixture is lean, as shown by the point a2, then the fuel supply is increased.

Also, if the measured crank angle giving the desired burning rate, for example, the rate b1, is advanced from the desired vertical line, then the amount of fuel supply is decreased. Alternatively, if the crank angle is later for the desired burning amount, as at the point b2, then the fuel supply amount is increased.

It should be noted that the maps which are employed can either set the desired burning rate at a given crank angle or the crank angle at which the desired burning rate is reached. That is, the control can be based either on angle of the crankshaft or burning rate at a desired angle.

Figure 11:
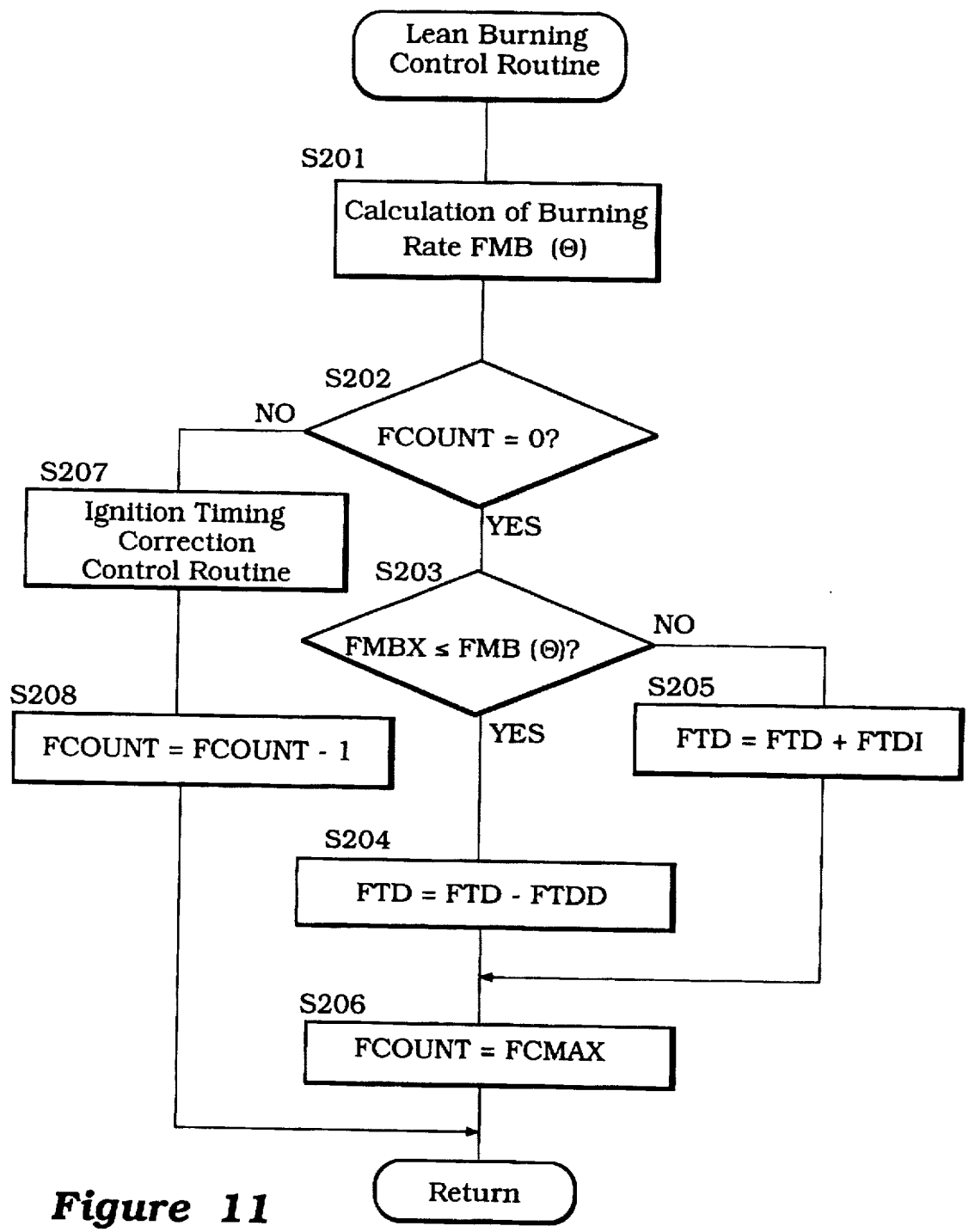
FIG. 11 is a block diagram showing the control routine employed in order to obtain lean burning and to control the ignition timing to obtain the desired lean burning or selected other condition.

FIG. 13 illustrates the control for changing the initiation of ignition utilized in this embodiment, and particularly the procedure followed at the step S207 of FIG. 11. This control routine starts and moves to the step S207-1 so as to determine the desired change in combustion ratio or FMB (ΔFMB). This is done by finding the difference between the actual FMB (FMBθΔ to the target FMB (FMB).

The difference ΔFMB then is looked up on a map at the step S207-2 to read a corrected variable gi. This amount is the amount of correction required to achieve the amount ΔFMB.

The program then moves to the step S207-3 to correct the previous ignition timing signal IGTD by this amount so as to set a new ignition timing.

The program then moves to the step S207-4 to determine if the corrected amount is positive or negative by comparing it with zero. If it is positive, and that is the indication of an advance in spark timing, then the program moves to the step S208-a. This compares the new ignition timing amount IGTD with a maximum advance limit IGTDF. If the new ignition timing is more advanced from that, then the program repeats, and no adjustment is made.

If, however, the new ignition timing is less than the maximum advance amount, then the program moves to the step S209-a to see if the new ignition timing is at the maximum advance. If it is, the program then returns without making an adjustment. In a similar manner, if the ignition timing calls for a retardation because IGTD is less than or equal to zero at the step S207-4, the program moves to the step S208-b. At the step S208-b, the new ignition timing is compared with the maximum permitted retardation timing IGTDR. If it is not less than or equal to that amount, the program repeats. If it is, then the program moves to the step S209-b, where it is determined if the IGTD is equal to IGTDR. If it is, then no adjustment is made, and the program returns.

Figure 13A:
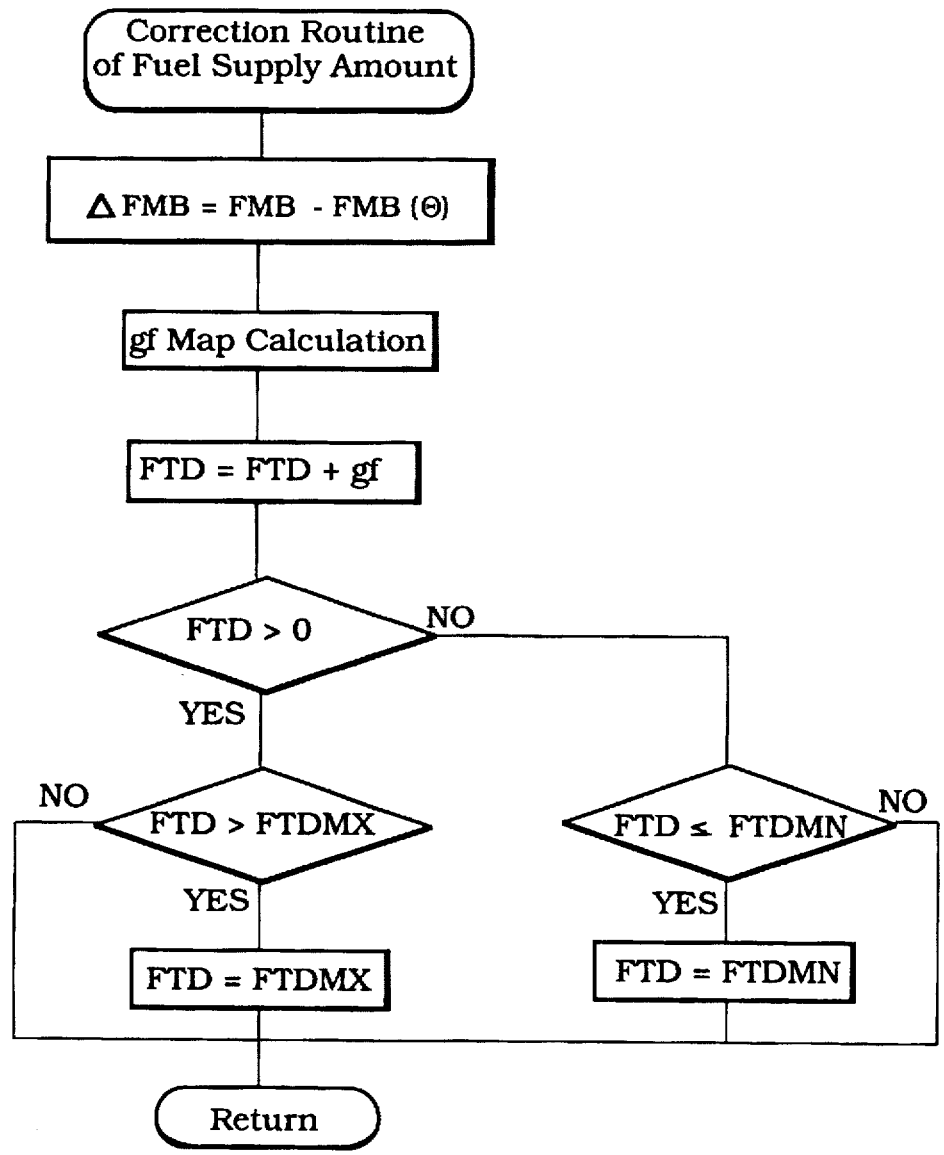
FIG. 13A is a block diagram showing the control routine to control the fuel supply amount to obtain the desired lean burning or selected other running condition.
Figure 14:
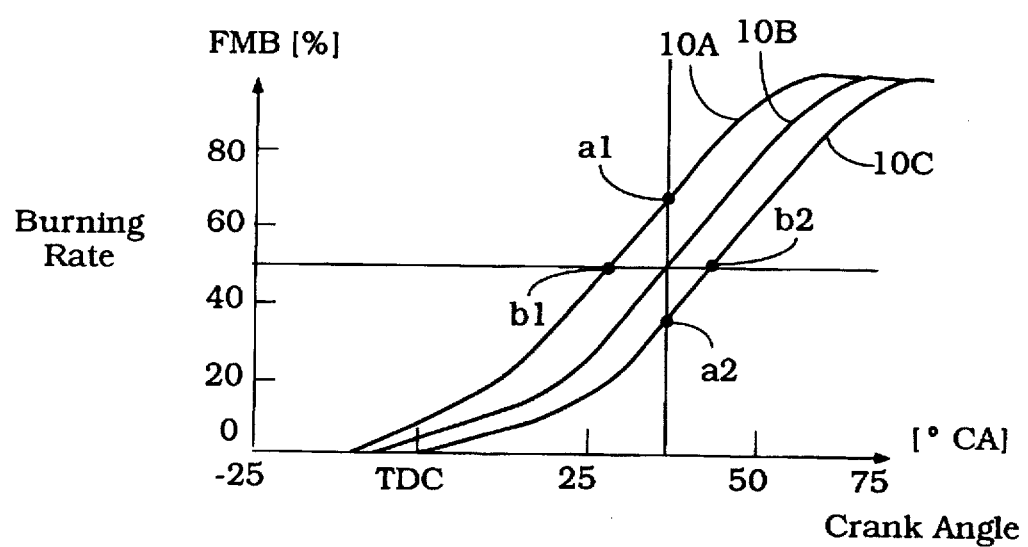
FIG. 14 is another graphical view showing the relationship of FMB to crank angle and showing how this can be adjusted in accordance with the control routine for this feature of the invention.

Fuel supply amount adjustments are made by a control routine the same as in FIG. 13 except fuel amount values are substituted for spark advance changes. FIG. 13A shows the fuel adjustment control routine. Since the routine is the same as that in FIG. 13 and only the values and system adjusted is different, further description of this figure of the theory is not believed necessary to permit those skilled in the art to practice the invention. Fuel supply amount is indicated by the characters F and f in FIG. 13A as opposed to the characters I and i used in FIG. 13 to denote the ignition angle amounts.

Figure 15:
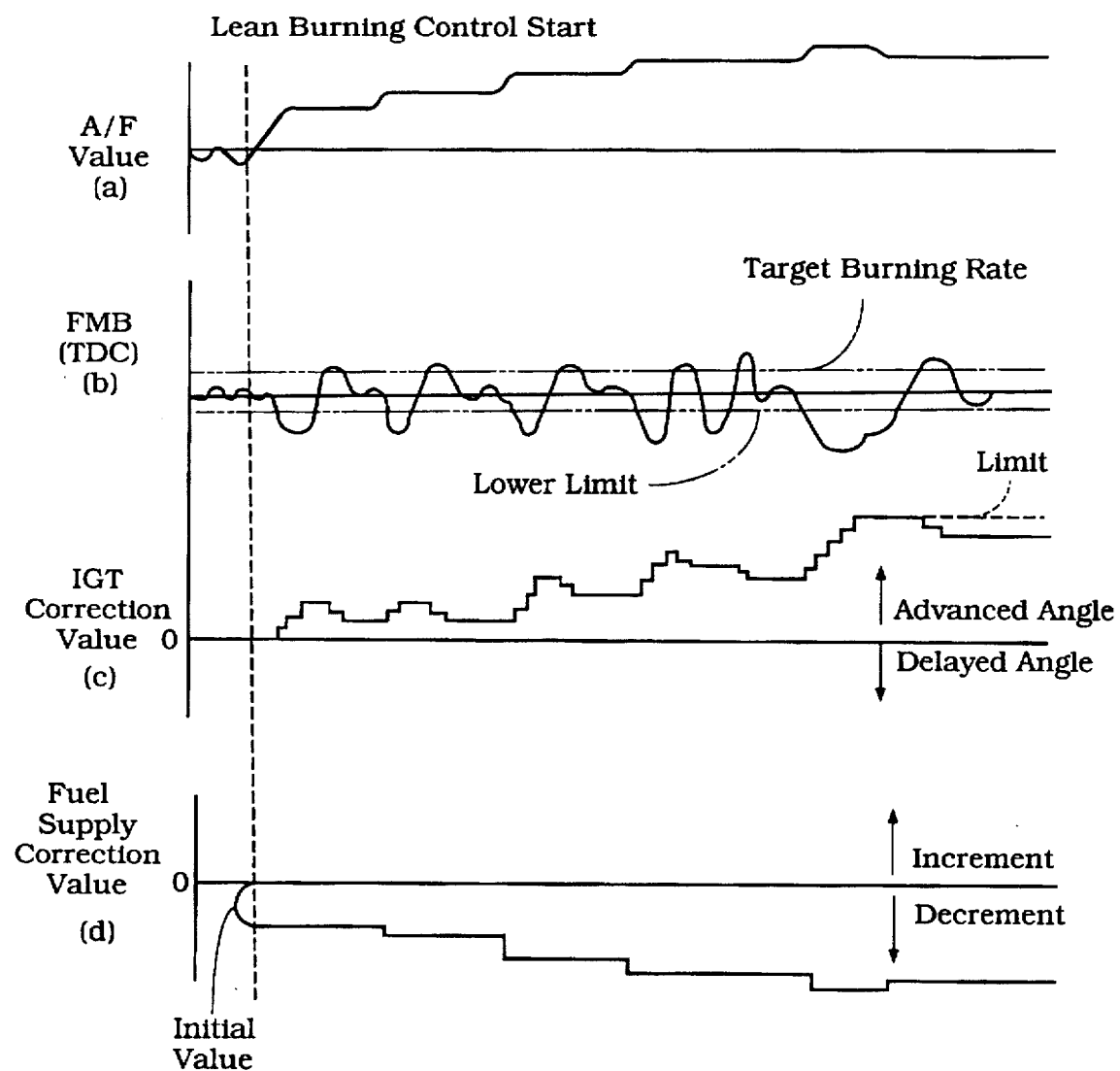
FIG. 15 is a graphical view showing the air-fuel ratio, FMB, ignition timing correction, and fuel supply correction to obtain the lean burning condition within the desired range.

FIG. 15 is a diagram which shows the way certain factors, such as air-fuel ratio, FMB, ignition timing, and fuel correction supply values, change during the lean burn control mode. As should be apparent from the foregoing description, when lean burning control is started on the basis of the target fuel burning rate is obtained through ignition timing control by advancing or delaying the ignition timing value and by incremental corrections in the fuel supply value, so as to keep the air-fuel ratio appropriate and stable. That is, in lean burning, it is preferred to perform fuel supply control wherein the target burning rates are provided within a predetermined tolerance.

First target burning rates larger than those in the map data and smaller than those in the map data are set. The fuel supply is increased when the detected burning rate is smaller than the second target burning rate or decreased when the detected burning rate is larger than the first burning rate. Fuel supply is not changed when the detected burning rate falls within the first and second target burning rates. In a like manner, the target crank angles for spark advance are provided with tolerances, and adjustments are not made unless those tolerances are exceeded. In conditions when the engine load is less than a predetermined value, or when the engine speed is lower than a predetermined value, either or both of the controls can be performed. These can be based either on a comparison of the magnitude between the first and second and detected burning rates and a fuel supply control or ignition timing control based upon the advance delayed relation between the first and second and detected crank angles.

The affect of the burning rates on HC and NOX emissions at a given crank angle of 50 degrees after top dead center, such as 50 degrees and when operating on a lean air-fuel ratio. It may be seen that by picking the FMB amount as set by the vertical broken line, both emissions can be minimized to an optimum amount.

Figure 17:
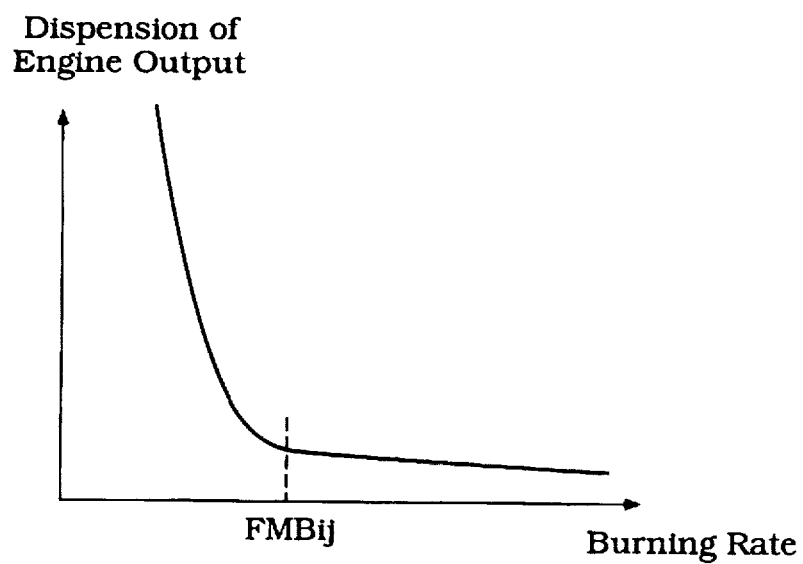
FIG. 17 is a view showing how the engine output can vary in relation to FMB.

FIG. 17 is a graphical view showing how the FMB or combustion burning rate affects a reduction in engine torque or power. As may be seen, if the mean FMB is set at 70%, hydrocarbon (HC) emissions can be kept small and $NO_x$ emissions can be kept small, and the loss of engine power also is minimized. Thus, the desired FMB at a given crank angle for a given engine condition to achieve optimum lean burn can be determined experimentally and preprogrammed into the map of the ECU 38. This can be done in accordance with a map of the type shown in FIG. 9.

Figure 18:
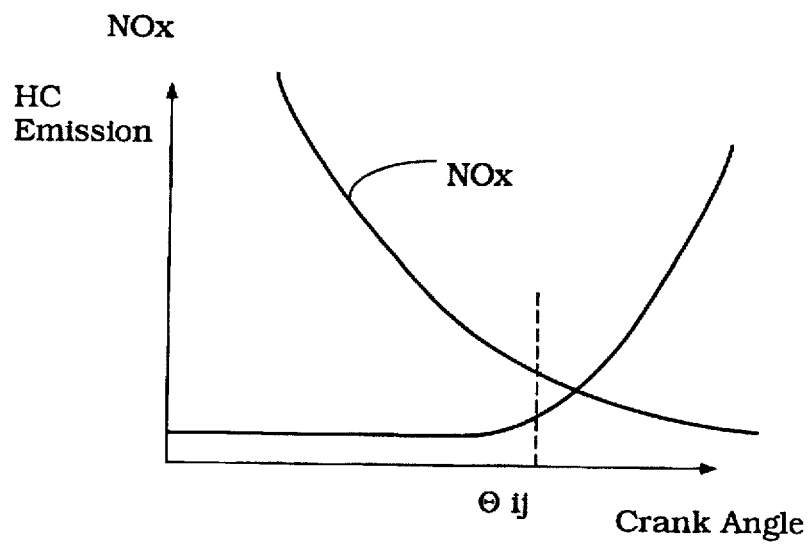
FIG. 18 is a graphical view showing the $NO_x$ and hydrocarbon emissions at various crank angles.
Figure 19:
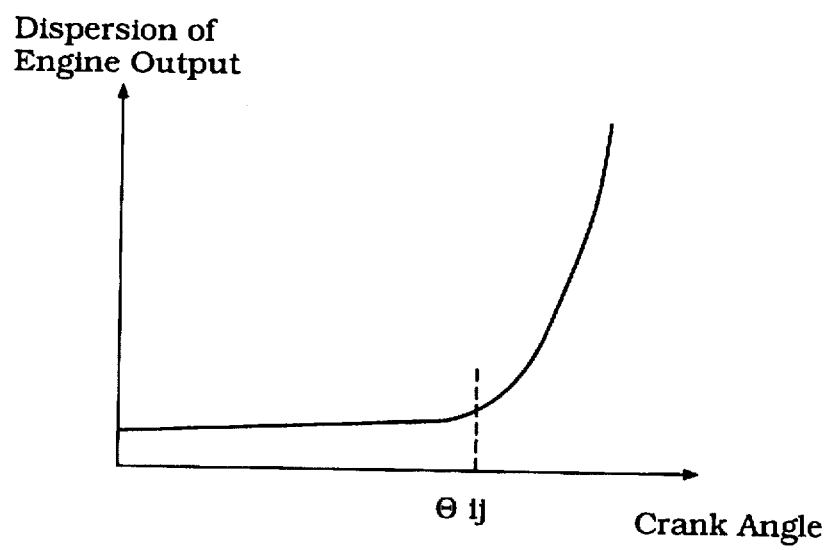
FIG. 19 is a graphical view showing the reduction of engine output in relation to crank angle for comparison purposes with FIG. 18.

FIG. 18 is a diagram showing the correlation between crankshaft angle and $NO_x$ and hydrocarbon (HC) emissions for a lean air-fuel ratio and a burning rate of 70%. FIG. 19 is a graphical view showing how engine power loss can be minimized by picking these values, with the vertical line representing the crank angle at which minimum power loss is obtained while maintaining the good emission controls as shown in FIG. 18.

The lean burning control described can be applied by controlling both ignition timing and fuel supply amount when the engine load is smaller than a predetermined amount or when engine speed is below a predetermined amount. When the engine speed or engine load are not less than that predetermined amount, then only ignition timing control should be performed.

In the described lean burn control mode described, the discussion has centered on measuring the mass burn rate or combustion rate at a given crank angle and effecting the controls based upon this. Like the other control routines described herein, it is also possible to base the control by measuring the mass burn rate or combustion rate and comparing it with a target amount and by measurement of the crank angle at which the target rate is achieved. Adjustments in the angle can then be made based upon appropriate maps.

Next will be described the control for operating under transient conditions detected at the step S116 and performed in accordance with the control routine S116-a of FIG. 4. This is the control condition which has been indicated as condition 2, which is set in the memory C as the value c=2.

In this control, it is also desirable to ensure that there is correction made for the density of the intake air by correcting for the temperature and the barometric pressure. As has been previously noted by describing the control routine in FIG. 13, this compensation calculation is made at the step S17. That calculation method will now be described by reference to FIG. 20. This program begins at the step S17-a, wherein a correction is made for the intake air temperature and barometric pressure. The program then moves to the step S17-b so as to determine whether the flag is set at the state zero or 1. If at the step S17-b the state is not set to the value s=0, the program moves to the step S17 so as to transmit a note to correct the correction data from the previous reading.

If, however, at the step S17-b, the flag is not set, the program moves to the step S17-d to determine if the flag is set. If it is not, the program repeats. If, however, the flag is set at the step S17-d, the program moves to the step S17-e so as to implement the initial correction. The program then moves to the step S17-f so as to set the flag in the state 2 to indicate that the correction has been accomplished.

Figure 21:
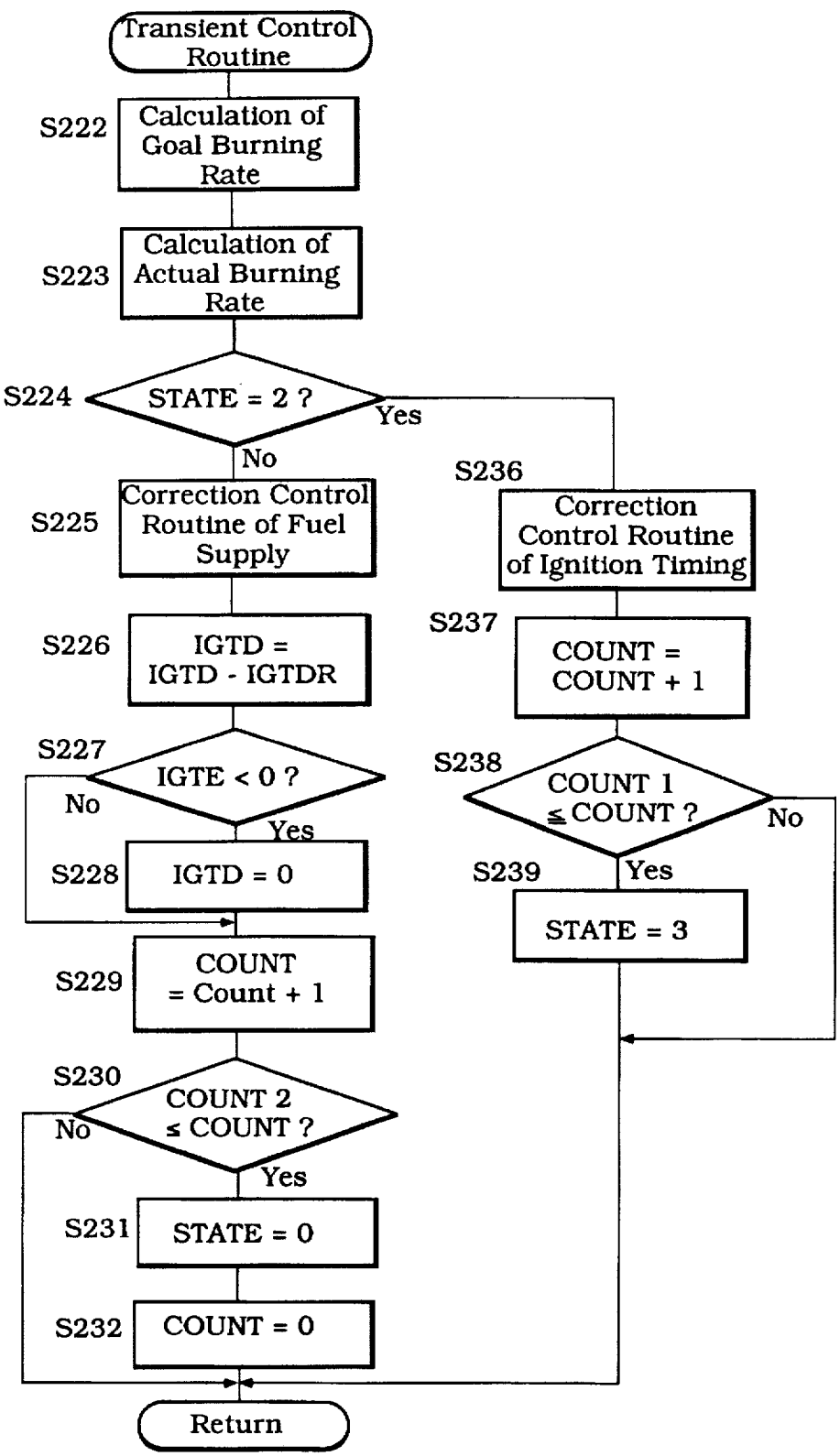
FIG. 21 is a block diagram showing the transitional control routine employed during either accelerations and/or decelerations.

The program then moves to the routine shown in FIG. 21, wherein corrections are made in the goal burning rate and actual burning rate, and fuel supply and ignition timing controls. Thus, if the control condition is set in the condition of state C=2, then the transient control will be performed if the other conditions are met. This transient control is performed in connection with the control routine shown in FIG. 21. The program begins and is initialized in the main routine after transient determination and before the execution in every cycle.

When begun, the program moves the step S222 to read the goal combustion rate in the transient stage from a map of the type previously described, but specialized for this condition. The program then proceeds to the step S223. In the step S223, the actual burning rate is calculated by the equations aforenoted.

Figure 20:
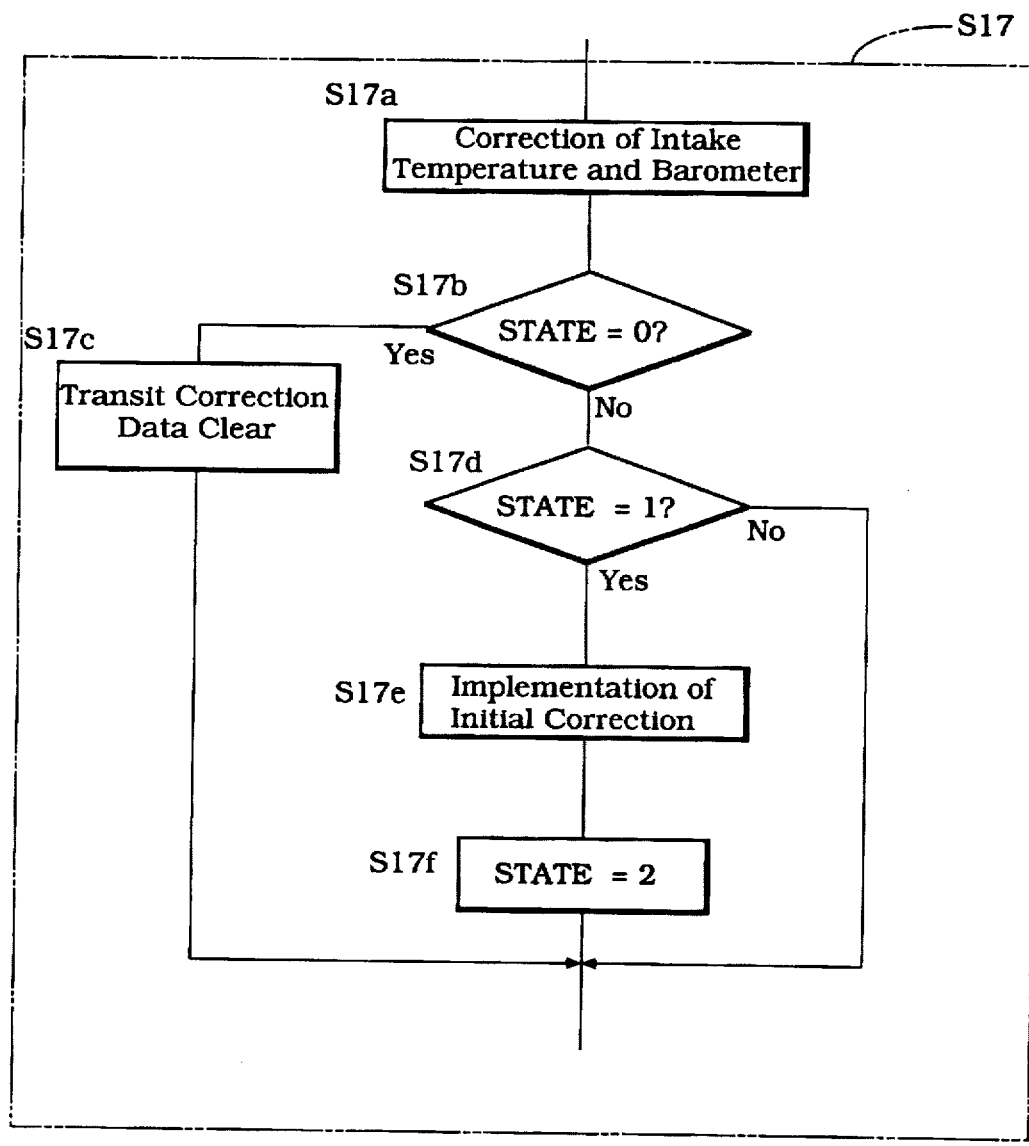
FIG. 20 is a block diagram showing how in the control routine there are corrections made for variations in intake air temperature and atmospheric pressure.

The program then moves to the step S224 to determine if the transient control condition C=2 has been set in accordance with the routine of FIG. 20. If it has, then the program proceeds onto the step S236. If, however, at the step S224 the state C=2 is not set, the program moves to the step S225 so as to execute the composition control routine for the amount of fuel, in accordance with the normal procedure.

The program then goes to the step S226 to decrease the initial compensation amount of spark timing by the compensation amount IGTDR. The program then moves to the step S227 to determine if the new ignition timing IGTE is less than zero. If it is not, the program jumps ahead. If it is, the program then moves to the step S228 to see if IGTD= zero. The program then moves to the step S229 to add the 1 to the transient control execution counter, and then goes to the step S230.

The program at the step S230 determines if the count of the counter is greater than or equal to 2. If it is, the program returns. If, however, at the step S230 it is determined that the counter value is greater than or equal to 2, the program moves to the step S231 so as to set the transient control condition variable to zero, and the program then moves to the step S232 to reset the counter to zero, and then returns.

If, however, at the step S224 it is determined that the state of the counter is 2, then the program moves to the step S236 to perform the correction control routine for ignition timing. The program then moves to the step S237 so as to add 1 to the counter of the counter. The program then moves to the step S238 to determine if the counter value is greater than or equal to 1. If it is not, the program returns. If it is, then the state is equal to 3, and the program returns.

In accordance with the transient control routine, the spark timing is adjusted first, in accordance with the method previously described. This is basically the same methodology as followed in FIG. 13 for the lean burn combustion control, but obviously different values are set. Also, the fuel supply amounts are adjusted, in accordance with a control routine as previously described in conjunction with FIG. 13. Again, however, different values are employed. However, in order to simplify this description, reference may be had to those two figures for the understanding of how the ignition timing and fuel injection amounts are corrected.

Figure 22:
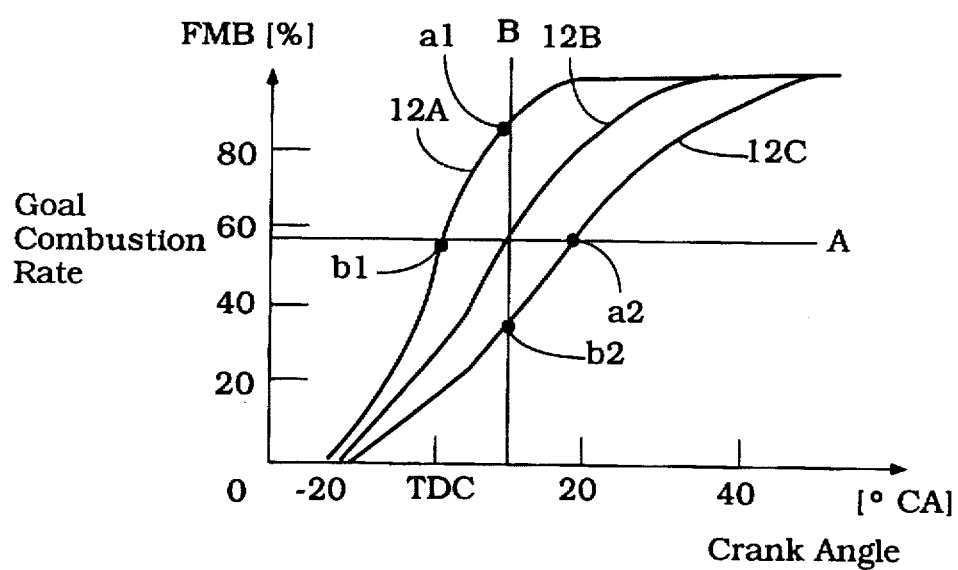
FIG. 22 is a graphical view showing the relationship of the goal combustion rate to crank angle in order to accommodate transient conditions.
Figure 23:
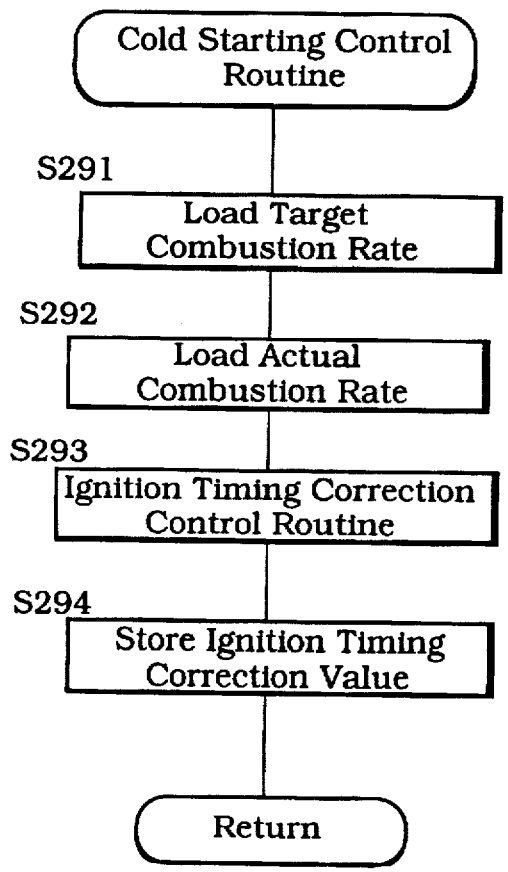
FIG. 23 is a block diagram showing the cold starting control routine.

FIG. 22 is a graphical view that shows how, with this embodiment changing the amount of fuel supplied without changing the beginning of fuel supply, has a significant difference on the combustion rate. In a regard, this configuration is similar to the lean burn configuration shown in FIG. 12. However, with this particular control routine, the curves all converge at a point, although the convergence occurs later in the piston stroke. However, the principle is basically the same, and thus transient control can also be improved by first correcting the ignition timing based on throttle opening or engine speed, and then changing the fuel supply amount. Also, this improves $NO_x$ emissions.

Referring again to the control routine shown in FIG. 21, it may be possible to cancel the steps S224 through S232 and to execute the step S236 immediately after the execution of the step S223. Thus, in the detection of a transient condition increasing and correcting the amount of fuel supply more than according to the throttle opening or engine speed, can obtain combustion conditions wherein the $NO_x$ is reduced while the best torque is obtained corresponding to at least one of the load or engine speeds. In this condition, the storage of the combustion rate at a given crank angle into a memory as a map data can be utilized to update the information.

Also, it may be possible to cancel the steps S224 and S236 through S239 and execute the step S225 immediately at the completion of the step S223. If this is done, then the deviation from the desired burning rate can be controlled by increasing the amount of fuel supply if the detected rate if low, and decreasing the amount of fuel supply if the detected rate is high.

Also, rather than using the basis of measuring the burned fuel rate at a given crank angle, the fuel burned rate may be detected, and corrections made in the parameters so as to ensure that this amount occurs at the desired crank angle.

The cold start control routine which is accomplished in accordance with the portion of the control routine indicated at the step S117 and the methodology at step S117-a of FIG.

4, will now be described. This control routine is employed so as to attempt to bring the exhaust gas temperature to a temperature as high as possible as quickly after the engine has started without causing excessive emission problems.

Figure 4:
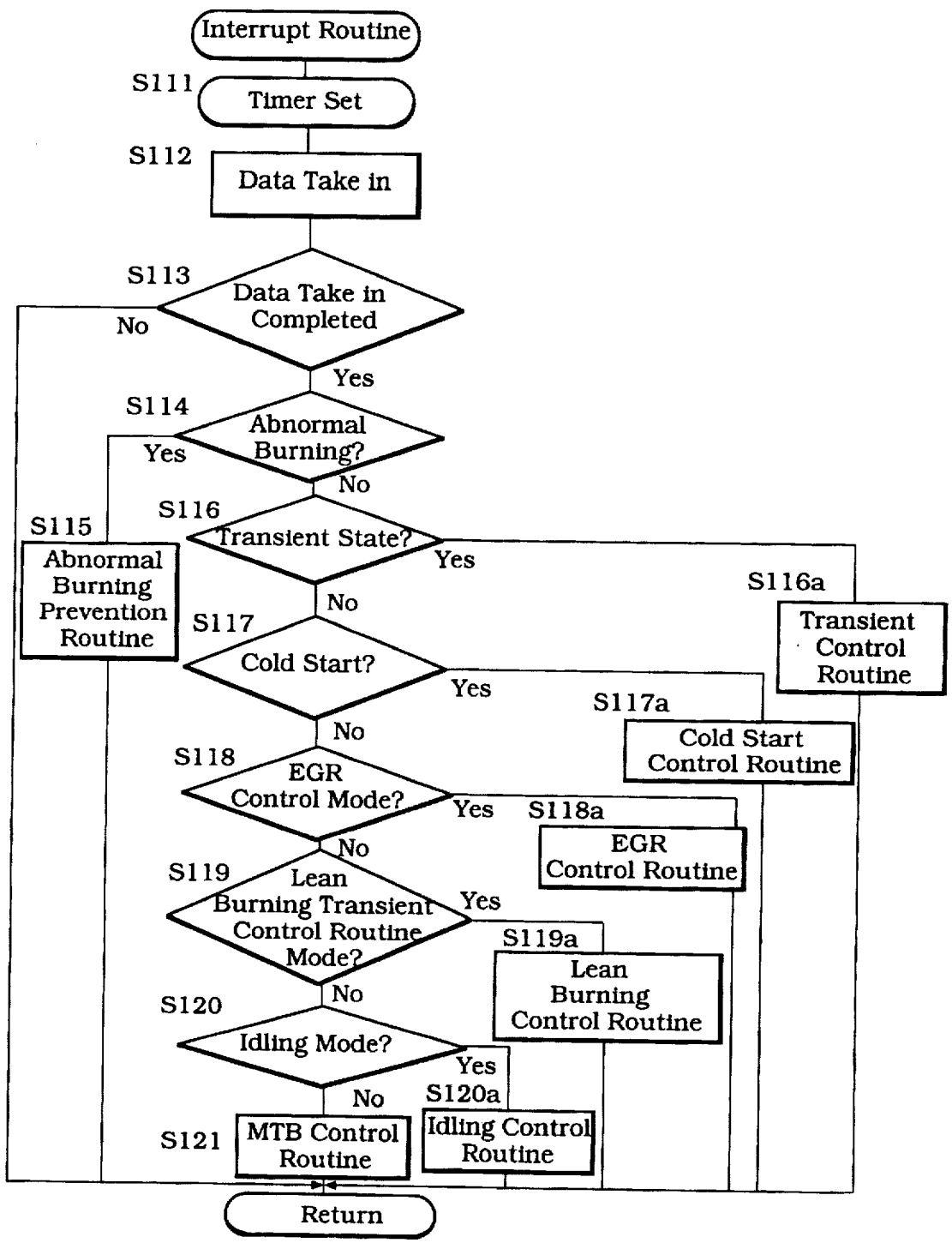
FIG. 4 is a block diagram showing the interrupt control routine when the normal engine control is interrupted so as to accommodate a specific type of desired running performance.

The control routine is illustrated in FIG. 20 and begins when at the step S117 in FIG. 4 indicates a positive answer, and this control routine is the routine which occurs at step S117-a.

After the program starts, it moves to the step S291 to set the load target combustion rate based upon a map indicative of the load. The program then moves to the step S292 so as to measure the actual combustion rate at that load. The program then moves to the step S293 so as to correct the ignition timing for firing the spark plug or beginning ignition by beginning injection in a diesel engine.

As has been noted from the previous descriptions, the change if ignition timing is effective to change the combustion burn rate at given crank angles, as shown in, for example, FIGS. 7 and 10. Again, the correction is made either by measuring the mass burn rate at a given crank angle and adjusting to maintain the desired value by advancing or retarding the ignition timing in the manner already described. Alternatively, a reading may be taken when the mass burn rate is at its desired position, and then the angle of that position is adjusted by changing the ignition timing, also in the manner described.

Figure 24:
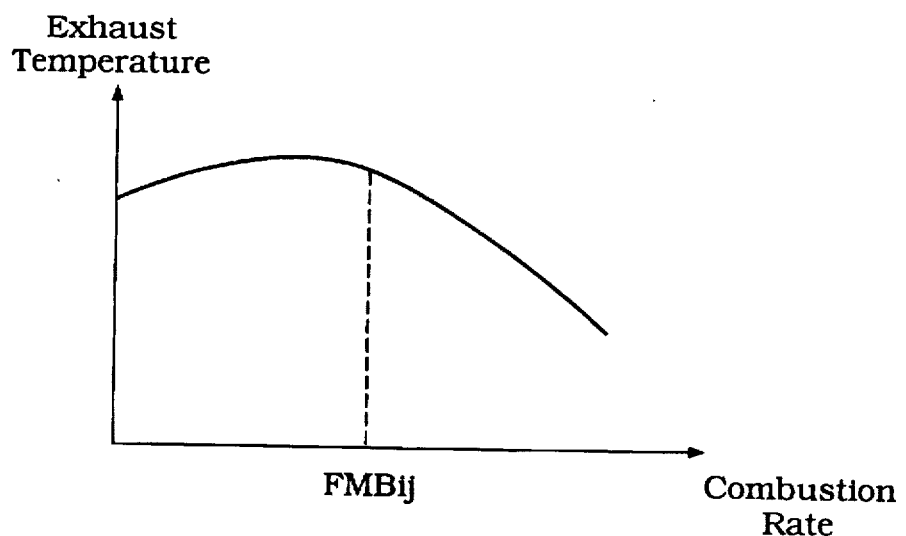
FIG. 24 is a graphical view showing how the combustion rate affects exhaust temperature.

FIG. 24 is a graphical view that shows how the exhaust temperature varies with the mass burn rate. By picking a mass burn rate at the appropriate value, it is possible to maintain a high exhaust temperature. This can also be utilized to control the $NO_x$ and hydrocarbon emissions in the amounts and in the manner previously described.

Figure 25:
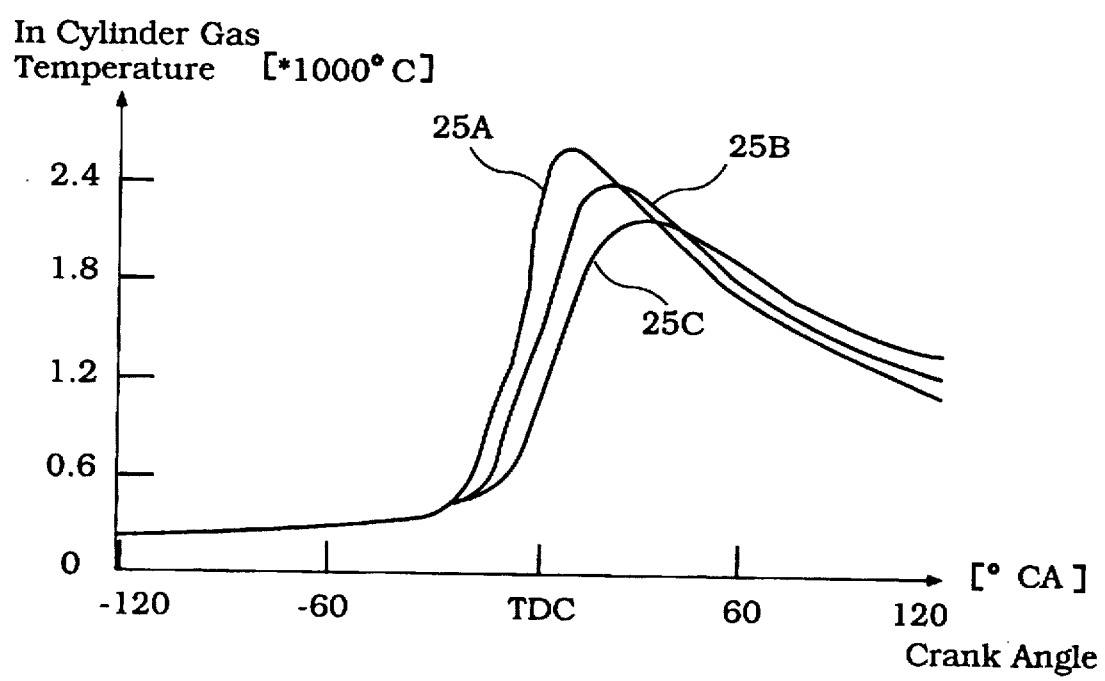
FIG. 25 is a graphical view showing how the in-cylinder gas temperature varies with crank angle in accordance with varying burn rates.

FIG. 25 is a view which shows the in-cylinder temperature in relation to crank angle at varying burn rates, with the maximum burn rate being shown by the curve 25a and the lower burn rates being shown by the curves 25b and 25c. It may be seen that by reducing the burn rate, the in-cylinder gas temperature is elevated at the end of the stroke and hence, the exhaust gas temperature can be increased by utilizing such a relationship.

Figure 16:
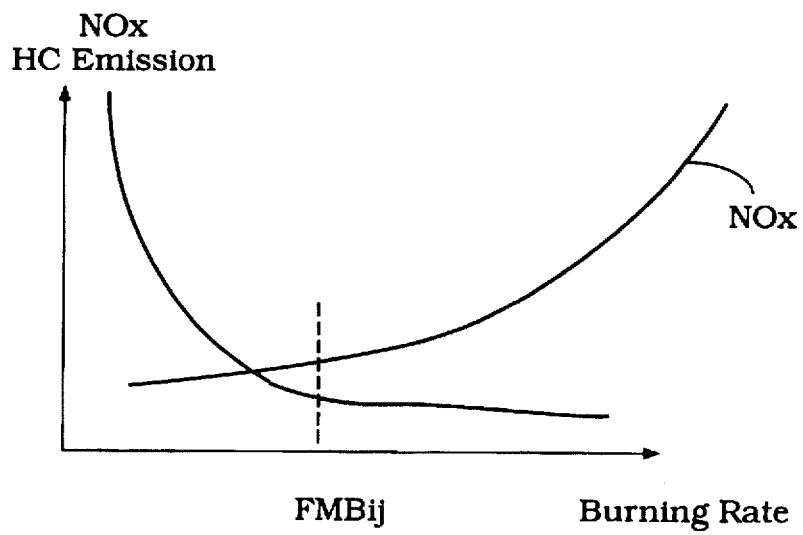
FIG. 16 is a graphical view showing how the hydrocarbon and $NO_x$ control will vary by changing the burning rate.
Figure 26:
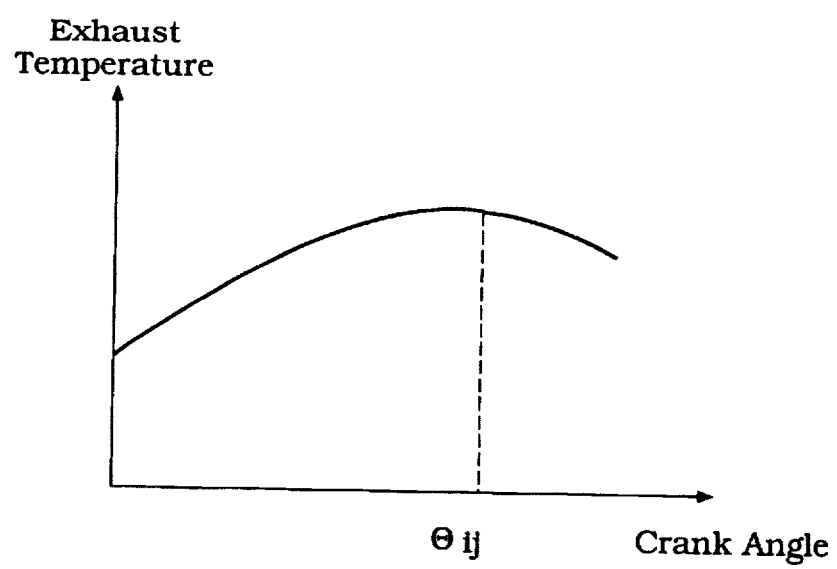
FIG. 26 is a graphical view showing again how exhaust temperature varies with crank angle.
Figure 27:
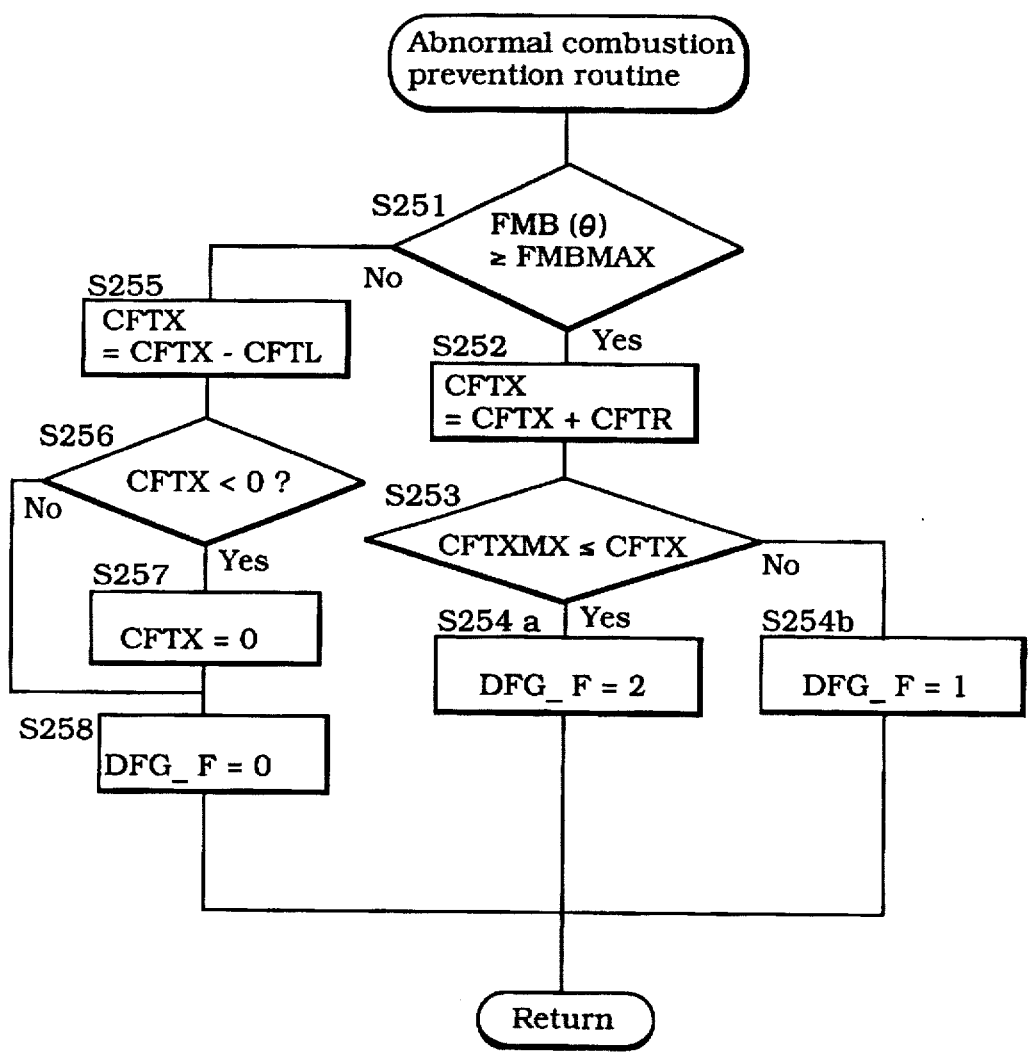
FIG. 27 is a block diagram showing the control routine utilized to perform knock control.

Thus, the optimum results can be obtained, as shown in FIG. 26, when the mass burn rate is about 70 degrees at the approximate crank angle of 50 degrees after top dead center. This control also can be utilized to reduce the amount of engine power loss under this special state operating condition, as already described and by reference to FIGS. 16 and 17.

Next will be described the control routine for the abnormal combustion state, i.e., the state when there is a likelihood of engine knocking occurring. This is the control routine performed in the step S115 in FIG. 4. This addition is compensation for when the engine is running in a condition when knocking is likely to occur so as to prevent its actual occurrence. The way this is done is by comparing at the step S251 the actual burn rate or combustion ratio with a combustion ratio FMBMAX, which is indicative of an incipient knocking condition. If the FMB at the measured angle is less than or equal to FMBMAX, the program moves to the step S255 and follows a routine which will be described later.

If, however, the FMB is determined at the step s251 to be equal to or higher than that where knocking can be deemed to occur, the program moves to the step S252 to add a further amount of fuel supply increment, referred to as a fueling cooling compensation increment CFTR, to the current fuel cooling compensation value CFTX, to set a new value.

The program then moves to the step S253 so as to compare this new value with a maximum limit value CFTXMX. If the new value is greater than that value, the program moves to the step S254-a. At this step, the program makes a combustion condition variable control signal DFG_F2 command, which is a command to cut fuel and cut ignition. The program then returns.

If, however, at the step S253 it is determined that the maximum fuel value has not been exceeded, the program moves to the step S254-b so as to set the flag equal to 1, and return.

Returning now again to the step S251, if the FMB at the beginning of the condition is equal to or greater than FMBMAX, the program moves to the step S255. At this step, an amount of additional fuel for cooling CFTL is subtracted from the existing fuel cooling component amount.

The program then moves to the step S256 to determine if the resulting CFTX is less than zero. If it is not, the program jumps ahead to the step S258. If, however, at the step S256 CFTX is determined not to be less than zero, it is checked to see if it is equal to zero at the step CFTX. The program then moves to the step S258 to make the combustion condition variable normal DFG_F0, and the program returns.

If abnormal combustion is determined, then the amount of fuel supplied to the engine is increased for that determined by the normal engine load to provide an additional amount of fuel for engine cooling.

As with the other previously described control routines, rather than measuring the FMB or combustion rate at a given crank angle, the crank angle can be measured where a predetermined value of combustion rate exists. That angle can then be utilized to determine whether knocking is likely to occur, and the appropriate corrections can be made.

Figure 28:
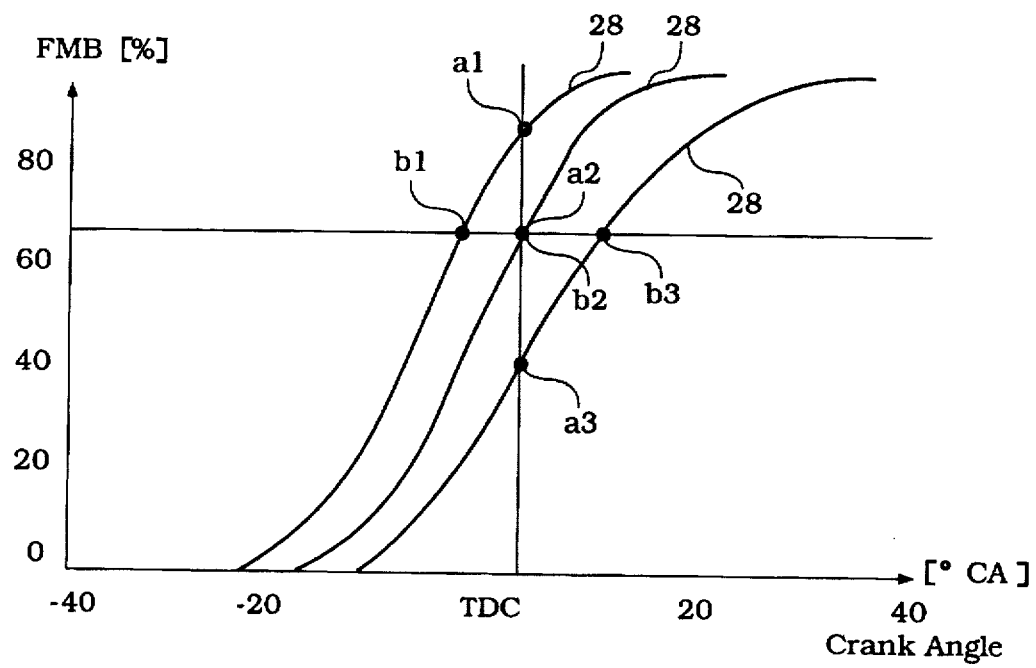
FIG. 28 is a graphical view showing how the burn rate is changed in relation to a predescribed crank angle in order to achieve the knock control.

FIG. 28 is a graphical view showing three curves, 28a, 28b and 28c, for FMB at a 20 degree spark advance angle before top dead center. The value b of crank angle chosen to read the FMB and determine if knocking is likely to occur is determined by the curve 28a. This is the curve which exists when knocking actually will occur. The curve 28b is a curve which indicates when the cylinder temperature is high enough that a sign of pre-ignition is detected. The curve 28c is a normal curve. Thus, by calculating the FMB at the crank angle, for example, that b1, abnormal conditions are determined if the FMB is at the points a2 or a1. If either condition occurs, the amount of fuel supply is increased.

On the other hand, if the system operates by measuring the crank angle at which a prescribed combustion ratio such as a, the horizontal line in FIG. 28, then if the measured value of combustion is at the amounts b1 or b2 prior to the crank angle at which b3 exists, then an abnormal condition is sensed, and the amount of fuel supplied is increased.

Figure 29:
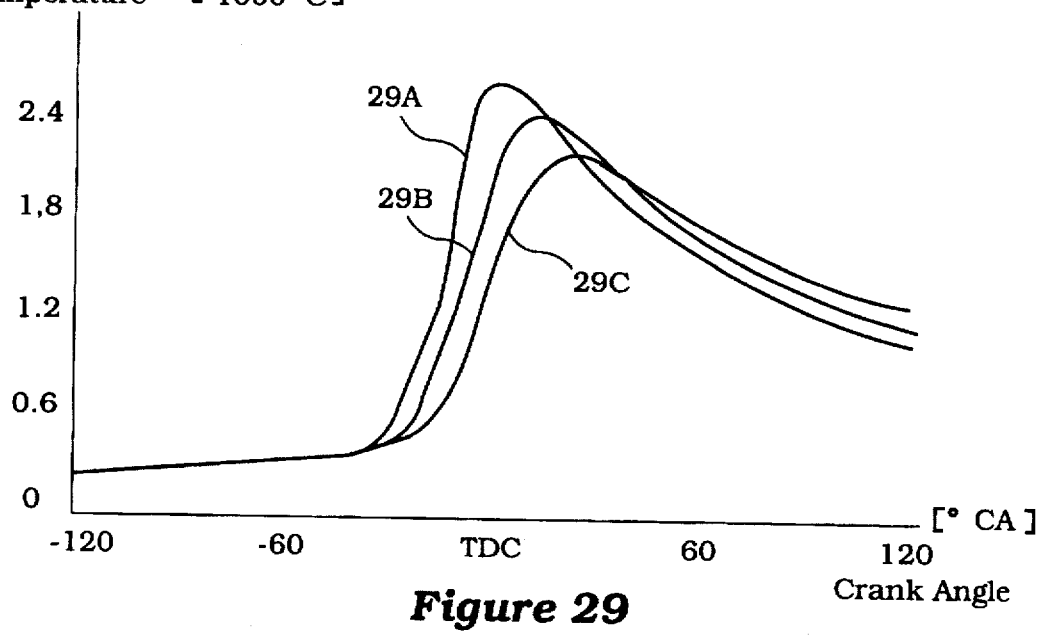
FIG. 29 is a graphical view showing how the in-cylinder gas temperature is changed by varying the burning rate in order to achieve knock control.

FIG. 29 is a graphical view showing in-cylinder temperature in relation to crank angle. The curve 29a is a curve that exists when knocking or pre-ignition actually occurs. The curve 29b is the type of curve which exists when knocking or pre-ignition is likely. Curve 29c is a normal curve. When the in-cylinder temperature at a angle exceeds that of curve 29c, then the cylinder temperature can be lowered by performing fuel cooling by supplying additional fuel to prevent knocking.

Figure 30:
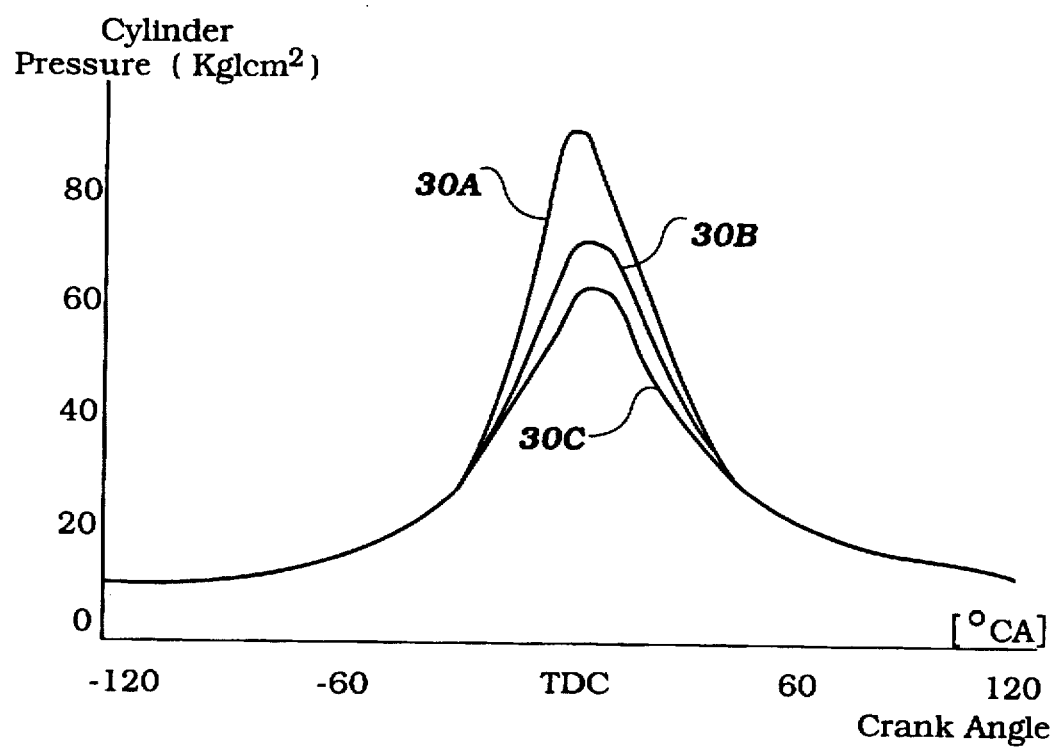
FIG. 30 is a graphical view showing how the cylinder pressure is varied when the knock control strategy is practiced.

FIG. 30 is a graphical view that shows the relationship of crank angle to cylinder pressure. The curve 30a indicates the pressure curve in the cylinder when knocking occurs, while the curve 30b indicates the condition when knocking is likely to occur. Curve 30c is normal. Thus, if the in-cylinder pressure at a given crank angle exceeds that of curve 30c, then the cooling routine can be applied by supplying additional fuel.

Again, the actual values of fuel correction amount are derived from three-dimensional maps of the type already mentioned, and thus, this portion of the routine will not be described because it is believed that it is obvious from the foregoing description.

Figure 31:
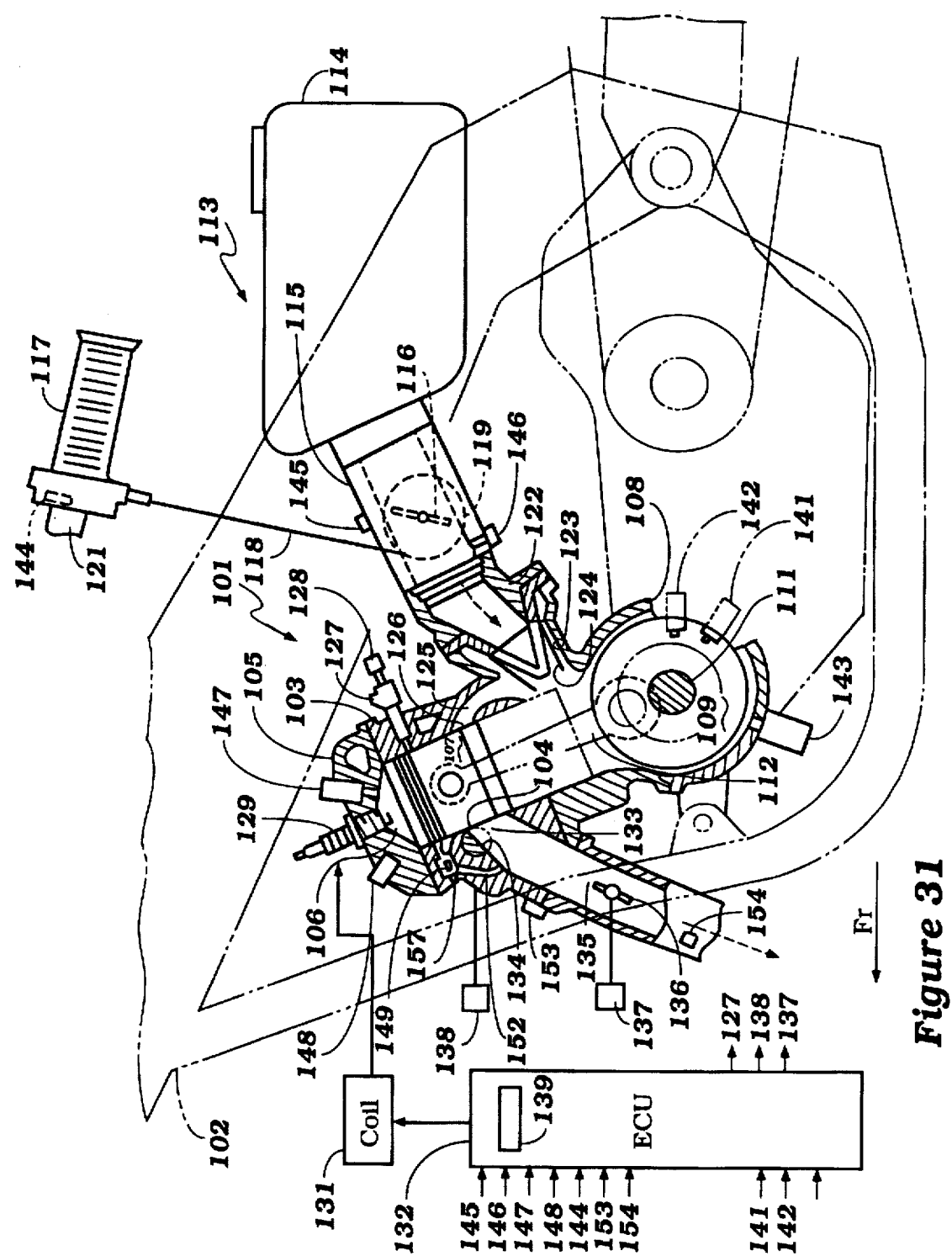
FIG. 31 is a partially schematic cross-sectional view of a portion of a two-cycle, crankcase compression, internal combustion engine constructed and operated in accordance with an embodiment of the invention. This view also shows the engine installed in a motorcycle, which is shown partially and in phantom.
Figure 32:
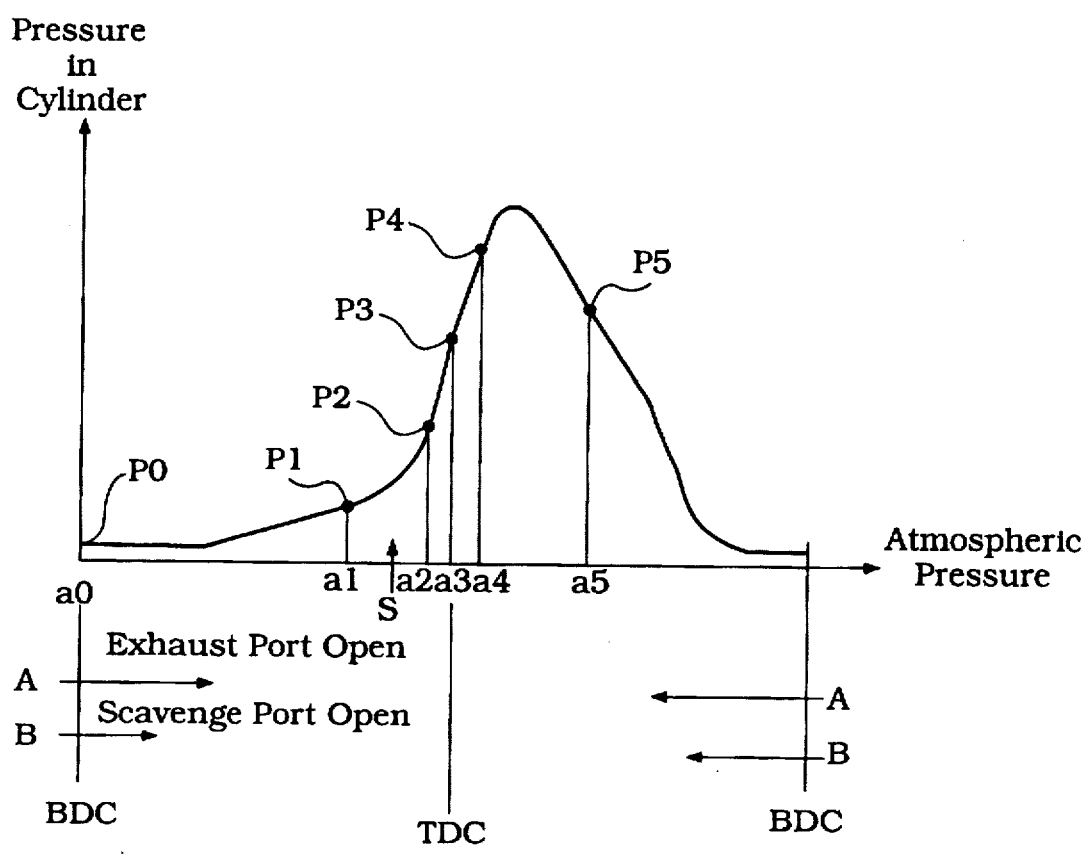
FIG. 32 is a pressure time curve for this embodiment, showing the in-cylinder pressure during a single cycle of operation, and showing the sampling points with this embodiment.

In the described methodology, reference has been made to the application of the principle to two-cycle engines, and particularly reference has been made to the control of the exhaust control valve timing with such engines. Although it is believed that the foregoing description will permit those skilled in the art to understand how the invention can be practiced in conjunction with two-cycle engines, such an embodiment is illustrated in FIGS. 31 and 32 and will now be described by particular reference to those figures.

In this embodiment, one cylinder of a multi-cylinder two-cycle internal combustion engine is shown in cross section, with the engine being identified generally by the reference numeral 101. Like the basic engine 11 of the previously described embodiment, the engine 101 is adapted to be utilized in a variety of applications, such as in motor vehicles, and a motorcycle application is shown. The motorcycle is illustrated partially in phantom and is identified by the reference numeral 102. Again, however, the invention also may be utilized in conjunction with automotive or other vehicular applications and/or in watercraft such as in outboard motors or inboard/outboard propulsion units for watercraft.

In this embodiment the engine 101 includes a cylinder block, indicated generally by the reference numeral 103, in which one or more cylinder bores 104 are formed. The upper ends of these cylinder bores 104 are closed by a cylinder head assembly 105 that is affixed to the cylinder block 103 in any known manner. The cylinder head assembly 105 is formed with individual combustion chamber recesses 106 that cooperate with pistons 107 that are slidably supported within the cylinder bores 104, and the cylinder bores 104, so as to form the combustion chambers of the engine.

The end of the cylinder bore 104 opposite that closed by the cylinder head assembly 105 is closed by a crankcase member 108 and defines a crankcase chamber 109 in which a crankshaft 111 is rotatably journaled in a known manner. The piston 107 is connected to a throw of the crankshaft 111 through a connecting rod 112.

As is typical with two-cycle engine practice, the crankcase chambers 109 associated with each of the cylinder bores 104 are sealed from each other. An intake charge is delivered to these crankcase chambers 109 by means of an induction system, indicated generally by the reference numeral 113. This induction system 113 includes an air inlet device 114 that draws atmospheric air and delivers it to a throttle body assembly 115. A throttle valve 116 is rotatably journaled in the throttle body assembly 115 and is operated by a twist-grip throttle control 117. A wire actuator 118 connects the throttle control 117 to the throttle valve 116 via a throttle pulley 119 that is affixed to the shaft of the throttle valve 116. The twist-grip throttle 117 is mounted on a handlebar assembly 121 of the motorcycle in a manner well known in the art.

The throttle body 115 is connected to an intake manifold 122, which serves intake ports 123 that communicate with the crankcase chambers 109. Reed-type check valves 124 are provided in these intake ports 123 and permit the air charge to flow into the crankcase chambers 109 when the pistons 107 move upwardly and close to preclude reverse flow when the pistons 107 move downwardly.

The charge thus compressed in the crankcase chambers 109 is transferred to the combustion chambers through one or more scavenging passages 125 that communicate with the cylinder bore 104 through scavenge ports 126. This charge is then further compressed in the combustion chambers 106.

A fuel injector of the direct-injection type 127 is mounted in the cylinder block 103 and sprays into the combustion chamber 106 at a timing, as will be mentioned. The fuel injector 127 receives fuel from a fuel rail 128, and this fuel pressure is regulated in a manner previously described. The fuel injectors 127 are electronically triggered and use a solenoid that operates an injector valve of a known type.

The charge thus delivered into the combustion chamber is then fired by a spark plug 129 mounted in the cylinder head 105. The spark plug 129 is fired by an ignition circuit 131, which is in turn controlled by an ECU 132.

The charge which is ignited in the combustion chambers 106 will burn and expand and drive the pistons 107 downwardly. They then open an exhaust port 133 formed in the cylinder block 105 to permit the exhaust gases to exit. An exhaust control valve 134 of a known type is journaled in the exhaust passage 133, and its angular position controls the timing of the opening and closing of the exhaust port, as is well known in this art.

The exhaust passage 133 communicates with an exhaust manifold 135, which in turn communicates with a suitable exhaust system for discharge of the exhaust gases to the atmosphere in a known manner. As is typical with two-cycle engine practice, the exhaust manifold 134 may have provided in it an exhaust control valve 136 which is actuated by a servo motor 137 so as to control the effect of pressure back pulses in the exhaust system so as to fine tune the performance of the engine.

The exhaust timing valve 134 is also controlled by a servo motor, this being indicated generally by the reference numeral 138.

As has been noted, the control for various engine functions utilizes the ECU 132. The ECU has a CPU 139 which receives certain inputs from sensors for the engine and provides the engine control in a manner similar to that previously described. These sensors include basic engine sensors, such as a crank angle sensor 141 that cooperates with teeth on the crankshaft 111 to provide a crank angle output signal. In addition, an rpm sensor 142 counts the teeth on this gear in relation to time to provide an engine speed signal.

Crankcase pressure is also measured by a pressure sensor 143. As is known in this art, crankcase pressure at certain crank angles is a very accurate indication of actual engine air consumption.

There is provided a throttle control position sensor 144 that cooperates with the twist-grip throttle 117 to provide a signal indicative of operator demand. In addition, the position of the throttle valve 116 or its pulley 119 is determined by a throttle position sensor 145.

Intake air pressure is sensed by a pressure sensor 146 mounted in the throttle body 115 downstream of the throttle valve 116.

An in-cylinder pressure sensor 147 is mounted in the cylinder head 105 and measures the pressure in the combustion chamber 106 in the manner previously described. Furthermore, there is provided a knock sensor 148, which is also mounted in the cylinder head 105 and which outputs its signal to the ECU 132, and specifically its CPU portion 139. The inputs of the various sensors are indicated in FIG. 5 by placing their sensor reference characters next to the arrows leading into the ECU.

The engine 101 is further provided with an oxygen sensor, indicated generally by the reference numeral 149. This oxygen sensor 149 is positioned in a chamber 151 that communicates with the combustion chamber 106 and which has a discharge passage 152 that communicates with a cylinder block exhaust passage 133 so as to sense the combustion products burned in the engine and determine the air-fuel ratio.

In the exhaust system there is further provided an exhaust pipe back pressure sensor 153 and an exhaust temperature sensor 154.

Of course, those sensors that are described in conjunction with this and the preceding embodiment, except for the in-cylinder pressure sensor, may be of any character, and any number of such sensors for sensing such desired conditions may be employed for engine control.

The basic control routine is as already described; however, with a two-cycle engine there is another timing arrangement by which the pressures are sensed, and this may be understood best by reference to FIG. 32. Generally, the concept is the same as that previously described. That is, it is desirable to measure the pressure in the combustion chamber at a time when the exhaust cycle is near its completion and the scavenge port has been opened so that the pressure P0 will be close to atmospheric. As with a four-cycle engine, this pressure reading may be taken at bottom dead center.

As may be seen in FIG. 32, the complete cycle operates only over one revolution of the engine with a two-cycle engine, rather than every two rotations as with a four-cycle engine. However, the general principle is the same as that previously described, and thus only a summary description of FIG. 32 is believed necessary to permit those skilled in the art to practice the invention.

The exhaust port and scavenge port timings are depicted in FIG. 32 as the reference characters A and B, respectively. With a two-cycle engine, the pressure P0 will be slightly greater than actually atmospheric pressure due to the exhaust tuning and the like. However, the principle is the same as that already described. In a two-cycle engine, the timing at the point a0, although shown at bottom dead center in FIG. 32, may actually occur maybe somewhat later than a four-cycle engine, such as 135° before top dead center. Also, the a5 reading is advanced relative to that of a four-cycle engine and may be 90° after top dead center. The pressure readings P1–P4 are all taken before peak pressure, and the readings P1 and P2 are taken before top dead center, while the pressure P3 may be taken at top dead center.

In view of the foregoing description of the control strategy with respect to a four-cycle engine and the reference to the relationship to the components of the two-cycle engine, such as the exhaust port timing valve 134 and the exhaust pressure valve 136, further description of the control strategy is not believed to be necessary.

Obviously, the foregoing description is that of preferred embodiments of the invention, and various changes may be made without departing from the spirit and scope of the invention. For example, the invention has been described in conjunction with either manifold injection in a four-cycle engine or direct injection with a two-cycle engine, but the injection locations may be reversed. Also, other forms of charge formers such as carburetors may be employed, rather than fuel injectors. Thus, the spirit and scope of the invention will be determined by the appended claims, and the foregoing description is exemplary only of preferred embodiments.

What is claimed is:

1. A method for controlling an internal combustion engine having at least one variable volume chamber in which combustion occurs, an induction system for delivering an air charge to said chamber, a fuel charging system for delivering a fuel charge to said chamber for combustion therein, an exhaust system for discharging combustion products from said chamber, said method comprising the steps of sensing the rate of combustion in said chamber at at least one relative volume of said chamber, comparing the measured rate of combustion with a target value, and adjusting at least one of said systems in a direction to establish the target value of rate of combustion.

2. A method for controlling an internal combustion engine as set forth in claim 1, wherein the rate of combustion is calculated from measurement of the pressure in the combustion chamber at at least two different relative volumes of the combustion chamber.

3. A method for controlling an internal combustion engine as set forth in claim 2, wherein the rate of combustion is determined by utilizing the pressures measured at the volumes and applying a linear approximation equation to them.

4. A method for controlling an internal combustion engine as set forth in claim 3, wherein the linear equation is:

$$qx=(Q1+Q2+\ldots+Qx)/(Q1+Q2+\ldots+Qn)\times 100.$$

5. A method for controlling an internal combustion engine as set forth in claim 1, wherein the rate of combustion is determined from calculating the amount of fuel burned from a linear approximation equation.

6. A method for controlling an internal combustion engine as set forth in claim 5, wherein the linear approximation equation is:

$$qx=b+b1(P1-P0)+b2(P2-P0)+\ldots bn(Pn-P0).$$

7. A method for controlling an internal combustion engine as set forth in claim 1, wherein the beginning of fuel charging is adjusted to establish the target value of rate of combustion.

8. A method for controlling an internal combustion engine as set forth in claim 1, wherein the amount of fuel delivered by the fuel charging system is varied to establish the target rate of combustion.

9. A method for controlling an internal combustion engine as set forth in claim 1, further including an ignition system for effecting ignition of the combustion in the chamber.

10. A method for controlling an internal combustion engine as set forth in claim 9, wherein the ignition system comprises a spark plug for firing a charge in the chamber.

11. A method for controlling an internal combustion engine as set forth in claim 10, wherein the time of firing of the spark plug is adjusted to achieve the target value of rate of combustion.

12. A method for controlling an internal combustion engine as set forth in claim 9, wherein the ignition system comprises direct fuel injection into the combustion chamber by the fuel charging system, and the engine operates on a diesel cycle.

13. A method for controlling an internal combustion engine as set forth in claim 10, wherein the amount of fuel delivered by the fuel charging system is also varied to establish the target rate of combustion.

14. A method for controlling an internal combustion engine as set forth in claim 10, wherein the beginning of fuel charging is also adjusted to establish the target value of rate of combustion.

15. A method for controlling an internal combustion engine as set forth in claim 1, wherein the target value of rate of combustion is determined from a map based upon engine speed.

16. A method for controlling an internal combustion engine as set forth in claim 15, wherein the map is a three-dimensional map based upon engine speed and load.

17. A method for controlling an internal combustion engine as set forth in claim 1, wherein the target value of rate of combustion is derived from a map based on engine load.

18. A method for controlling an internal combustion engine as set forth in claim 17, wherein engine load is measured by operator demand.

19. A method for controlling an internal combustion engine as set forth in claim 18, wherein operator demand is measured by throttle valve position.

20. A method for controlling an internal combustion engine as set forth in claim 1, wherein a target value of rate of combustion is applied for one running condition, and a different target value of rate of combustion is applied for a different running condition.

21. A method for controlling an internal combustion engine as set forth in claim 20, wherein the one running condition is normal engine running.

22. A method for controlling an internal combustion engine as set forth in claim 20, wherein the other running condition is maximum torque.

23. A method for controlling an internal combustion engine as set forth in claim 20, wherein the other running condition is cold starting.

24. A method for controlling an internal combustion engine as set forth in claim 20, wherein the other engine running condition is lean burn.

25. A method for controlling an internal combustion engine as set forth in claim 20, wherein the other running condition is incipient knocking.

26. A method for controlling an internal combustion engine as set forth in claim 20, wherein the other running condition is a transient condition.

27. A method for controlling an internal combustion engine as set forth in claim 1, wherein the engine is comprised of a reciprocating engine and the chamber is formed at least in part by a cylinder bore and a piston reciprocating in the cylinder bore, said piston being operative to drive an engine output shaft, the rate of combustion being determined at at least one output shaft angle.

28. A method for controlling an internal combustion engine as set forth in claim 27, wherein the rate of combustion is calculated from measuring the pressure in the combustion chamber at at least two different output shaft angles.

29. A method for controlling an internal combustion engine as set forth in claim 27, wherein the output shaft angle is measured at which the target pressure is reached, and the system is adjusted so as to obtain the target rate of combustion at the desired output shaft angle.

30. An internal combustion engine having at least one variable volume chamber in which combustion occurs, an induction system for delivering an air charge to said chamber, a fuel charging system for delivering a fuel charge to said chamber for combustion therein, an exhaust system for discharging combustion products from said chamber, means for sensing the rate of combustion in said chamber at at least one relative volume of said chamber, means for comparing the measured rate of combustion with a target value, and means for adjusting at least one of said systems in a direction to establish the target value of rate of combustion.

31. An internal combustion engine as set forth in claim 30, wherein the rate of combustion is calculated from measurement of the pressure in the combustion chamber at at least two different relative volumes of the combustion chamber.

32. An internal combustion engine as set forth in claim 31, wherein the rate of combustion is determined by utilizing the pressures measured at the volumes and applying a linear approximation equation to them.

33. An internal combustion engine as set forth in claim 32, wherein the linear equation is:

$$qx=(Q1+Q2+\ldots+Qx)/(Q1+Q2+\ldots+Qn)\times 100.$$

34. An internal combustion engine as set forth in claim 30, wherein the rate of combustion is determined from calculating the amount of fuel burned from a linear approximation equation.

35. An internal combustion engine as set forth in claim 34, wherein the linear approximation equation is:

$$qx=b+b1(P1-P0)+\ldots b2(P2-P0)+\ldots bn(Pn-P0).$$

36. An internal combustion engine as set forth in claim 30, wherein the beginning of fuel charging is adjusted to establish the target value of rate of combustion.

37. An internal combustion engine as set forth in claim 30, wherein the amount of fuel delivered by the fuel charging system is varied to establish the target rate of combustion.

38. An internal combustion engine as set forth in claim 30, further including an ignition system for effecting ignition of the combustion in the chamber.

39. An internal combustion engine as set forth in claim 38, wherein the ignition system comprises a spark plug for firing a charge in the chamber.

40. An internal combustion engine as set forth in claim 39, wherein the time of firing of the spark plug is adjusted to achieve the target value of rate of combustion.

41. An internal combustion engine as set forth in claim 38, wherein the ignition system comprises direct fuel injection into the combustion chamber by the fuel charging system, and the engine operates on a diesel cycle.

42. An internal combustion engine as set forth in claim 39, wherein the amount of fuel delivered by the fuel charging system is also varied to establish the target rate of combustion.

43. An internal combustion engine as set forth in claim 39, wherein the beginning of fuel charging is also adjusted to establish the target value of rate of combustion.

44. An internal combustion engine as set forth in claim 30, wherein the target value of rate of combustion is determined from a map based upon engine speed.

45. An internal combustion engine as set forth in claim 44, wherein the map is a three-dimensional map based upon engine speed and load.

46. An internal combustion engine as set forth in claim 30, wherein the target value of rate of combustion is derived from a map based on engine load.

47. An internal combustion engine as set forth in claim 46, wherein engine load is measured by operator demand.

48. An internal combustion engine as set forth in claim 47, wherein operator demand is measured by throttle valve position.

49. An internal combustion engine as set forth in claim 30, wherein a target value of rate of combustion is applied for one running condition, and a different target value of rate of combustion is applied for a different running condition.

50. An internal combustion engine as set forth in claim 49, wherein the one running condition is normal engine running.

51. An internal combustion engine as set forth in claim 49, wherein the other running condition is maximum torque.

52. An internal combustion engine as set forth in claim 49, wherein the other running condition is cold starting.

53. An internal combustion engine as set forth in claim 49, wherein the other engine running condition is lean burn.

54. An internal combustion engine as set forth in claim 49, wherein the other running condition is incipient knocking.

55. An internal combustion engine as set forth in claim 49, wherein the other running condition is a transient condition.

56. An internal combustion engine as set forth in claim 30, wherein the engine is comprised of a reciprocating engine and the chamber is formed at least in part by a cylinder bore and a piston reciprocating in the cylinder bore, said piston being operative to drive an engine output shaft, the rate of combustion being determined at at least one output shaft angle.

57. An internal combustion engine as set forth in claim 56, wherein the rate of combustion is calculated from measuring the pressure in the combustion chamber at at least two different output shaft angles.

58. An internal combustion engine as set forth in claim 56, wherein the output shaft angle is measured at which the target pressure is reached, and the system is adjusted so as to obtain the target rate of combustion at the desired output shaft angle.

* * * * *

UNITED STATES PATENT AND TRADEMARK OFFICE
CERTIFICATE OF CORRECTION

PATENT NO. : 5,738,074
DATED : April 14, 1998
INVENTOR(S) : Nakamura et al.

It is certified that error appears in the above-identified patent and that said Letters Patent is hereby corrected as shown below:

Column 28,
Line 19, please delete -- $(P1-P0)+\ldots b2$ -- and replace with -- $(P1-P0) + b2$ --.

Signed and Sealed this

Fourteenth Day of May, 2002

Attest:

Attesting Officer

JAMES E. ROGAN
Director of the United States Patent and Trademark Office